US012150473B2

(12) United States Patent
Hepworth et al.

(10) Patent No.: US 12,150,473 B2
(45) Date of Patent: Nov. 26, 2024

(54) AEROSOL PROVISION SYSTEM

(71) Applicant: Nicoventures Trading Limited, London (GB)

(72) Inventors: Richard Hepworth, London (GB); Mark Austin, London (GB); Benjamin Taylor, London (GB); Marina Trani, London (GB); Muhammad Fahim Ashraf, London (GB)

(73) Assignee: NICOVENTURES TRADING LIMITED, London (GB)

( * ) Notice: Subject to any disclaimer, the term of this patent is extended or adjusted under 35 U.S.C. 154(b) by 527 days.

(21) Appl. No.: 17/438,282

(22) PCT Filed: Mar. 11, 2020

(86) PCT No.: PCT/GB2020/050601

§ 371 (c)(1), (2) Date: Sep. 10, 2021

(87) PCT Pub. No.: WO2020/183167

PCT Pub. Date: Sep. 17, 2020

(65) Prior Publication Data

US 2022/0142236 A1 May 12, 2022

(30) Foreign Application Priority Data

Mar. 11, 2019 (GB) ..................................... 1903264

(51) Int. Cl.

*A24D 1/20* (2020.01)
*A24B 3/14* (2006.01)

(Continued)

(52) U.S. Cl.

CPC .................. *A24D 1/20* (2020.01); *A24B 3/14* (2013.01); *A24D 1/02* (2013.01); *A24F 40/20* (2020.01); *A24F 40/465* (2020.01); *H05B 6/105* (2013.01)

(58) Field of Classification Search

CPC . A24D 1/20; A24D 1/02; A24D 1/025; A24D 1/04; A24D 3/0216; A24D 3/061;

(Continued)

(56) References Cited

U.S. PATENT DOCUMENTS 10,362,804 B2 * 7/2019 Bessant .................... G08B 6/00
10,517,332 B2 * 12/2019 Sebastian ................ A24D 1/20

(Continued)

FOREIGN PATENT DOCUMENTS

CN 103929988 A 7/2014
EP 1909604 B1 12/2009

(Continued)

OTHER PUBLICATIONS

International Search Report and Written Opinion of International Application No. PCT/GB2020/050601, mailed May 29, 2020, 17 pages.

(Continued)

*Primary Examiner* — Alexander Gilman
(74) *Attorney, Agent, or Firm* — Husch Blackwell

(57) ABSTRACT

A non-combustible aerosol provision system includes an article comprising a rod of aerosol generating material having a circumference greater than 19 mm and a non-combustible aerosol provision device for heating the aerosol generating material of the article, the non-combustible aerosol provision device comprising a coil.

21 Claims, 9 Drawing Sheets

(51) Int. Cl.
*A24D 1/02* (2006.01)
*A24F 40/20* (2020.01)
*A24F 40/465* (2020.01)
*H05B 6/10* (2006.01)

(58) Field of Classification Search
CPC ........... A24B 3/14; A24B 15/12; A24B 15/14; A24B 15/283; A24B 15/30; A24F 40/20; A24F 40/465; A24F 40/57; H05B 6/105; H05B 6/36
USPC .......................................................... 131/329
See application file for complete search history.

(56) References Cited

U.S. PATENT DOCUMENTS

| | | | | |
|---|---|---|---|---|
| 10,595,559 | B2* | 3/2020 | Besso | A24D 1/008 |
| 10,602,770 | B2* | 3/2020 | Camus | A24D 3/04 |
| 10,609,955 | B2* | 4/2020 | Beard | A24D 3/10 |
| 10,842,184 | B2* | 11/2020 | Kadiric | A24D 1/042 |
| 11,154,088 | B2* | 10/2021 | Kadiric | A24D 1/02 |
| 11,202,467 | B2* | 12/2021 | Malgat | A24B 15/165 |
| 11,212,881 | B2* | 12/2021 | Fursa | A24F 40/465 |
| 11,375,745 | B2* | 7/2022 | Conner | A24D 1/22 |
| 11,375,753 | B2* | 7/2022 | Fursa | A24F 40/465 |
| 11,490,653 | B2* | 11/2022 | Mishra | A24D 3/06 |
| 11,564,411 | B2* | 1/2023 | Borges De Couraca | A24D 1/22 |
| 2007/0023056 | A1 | 2/2007 | Cantrell et al. | |
| 2010/0108084 | A1* | 5/2010 | Norman | A24D 3/048 131/338 |
| 2011/0192408 | A1* | 8/2011 | Inagaki | A24D 1/20 131/194 |
| 2012/0017925 | A1* | 1/2012 | Sebastian | A24D 1/02 131/345 |
| 2012/0017927 | A1* | 1/2012 | Kobal | A24D 3/048 131/337 |
| 2012/0037172 | A1* | 2/2012 | Allen | A24D 3/061 131/335 |
| 2013/0180534 | A1* | 7/2013 | Shen | A24B 15/286 131/332 |
| 2014/0305455 | A1* | 10/2014 | Crooks | A24D 3/061 131/332 |
| 2015/0027477 | A1* | 1/2015 | Yoshino | A24D 3/061 131/337 |
| 2016/0150825 | A1* | 6/2016 | Mironov | A24F 40/46 219/634 |
| 2017/0055574 | A1* | 3/2017 | Kaufman | H05B 6/105 |
| 2017/0055587 | A1* | 3/2017 | Zinovik | H03F 3/2176 |
| 2017/0119049 | A1* | 5/2017 | Blandino | H05B 3/34 |
| 2017/0340017 | A1* | 11/2017 | Thorens | A24F 40/40 |
| 2018/0000153 | A1* | 1/2018 | Zhou | A24D 3/04 |
| 2018/0007974 | A1* | 1/2018 | Thorens | A61M 15/003 |
| 2018/0035708 | A1* | 2/2018 | Kaljura | A24D 3/061 |
| 2018/0042294 | A1* | 2/2018 | Jordil | A24D 3/18 |
| 2018/0116275 | A1* | 5/2018 | Malgat | A24D 1/02 |
| 2019/0000134 | A1* | 1/2019 | Lavanant | A24D 3/04 |
| 2019/0075845 | A1* | 3/2019 | Malgat | A24D 1/20 |
| 2019/0313695 | A1* | 10/2019 | Kaufman | H05B 6/365 |

FOREIGN PATENT DOCUMENTS

| | | | |
|---|---|---|---|
| EP | 2368449 | A1 | 9/2011 |
| EP | 3020291 | A1 | 5/2016 |
| EP | 2996504 | B1 | 11/2016 |
| EP | 3229616 | B1 | 4/2020 |
| JP | 2009502194 | A | 1/2009 |
| JP | 2014525237 | A | 9/2014 |
| JP | 2016525341 | A | 8/2016 |
| JP | 2018501818 | A | 1/2018 |
| WO | 2010047389 | A1 | 4/2010 |
| WO | 2018182322 | A1 | 10/2018 |
| WO | 2019002377 | A1 | 1/2019 |

OTHER PUBLICATIONS

"International Preliminary Report on Patentability received for PCT Patent Application No. PCT/GB2020/050601, mailed on Sep. 23, 2021", 11 pages.

"Notice of Reasons for Rejection received for Japanese Patent Application No. 2021-554580, mailed on Nov. 15, 2022", 9 pages (4 pages of English Translation and 5 pages of Official Copy).

"Office Action received for Chinese Patent Application No. 202080035099.2, mailed on Nov. 27, 2023", 13 pages (5 pages of English Translation and 8 pages of Official Copy).

"Reasons for Rejection received for Koran Patent Application No. 10-2021-7032707, mailed on Dec. 14, 2023", 18 pages (7 pages of English Translation and 11 pages of Official Copy).

* cited by examiner

AEROSOL PROVISION SYSTEM

PRIORITY CLAIM

The present application is a National Phase entry of PCT Application No. PCT/GB2020/050601, filed Mar. 11, 2020, which claims priority from GB Application No. 1903264.8, filed Mar. 11, 2019, each of which is hereby fully incorporated herein by reference.

TECHNICAL FIELD

The present disclosure relates to a non-combustible aerosol provision system.

BACKGROUND

Certain tobacco industry products produce an aerosol during use, which is inhaled by a user. For example, tobacco heating devices heat an aerosol generating substrate such as tobacco to form an aerosol by heating, but not burning, the substrate. Such tobacco industry products commonly include mouthpieces through which the aerosol passes to reach the user's mouth.

SUMMARY

In accordance with embodiments of the disclosure, there is provided a non-combustible aerosol provision system comprising an article comprising a rod of aerosol generating material having a circumference greater than 19 mm and a non-combustible aerosol provision device for heating the aerosol generating material of the article, the non-combustible aerosol provision device comprising a coil.

BRIEF DESCRIPTION OF THE DRAWINGS

Embodiments of the invention will now be described, by way of example only, with reference to the accompanying drawings, in which.

DETAILED DESCRIPTION

Figure 1:
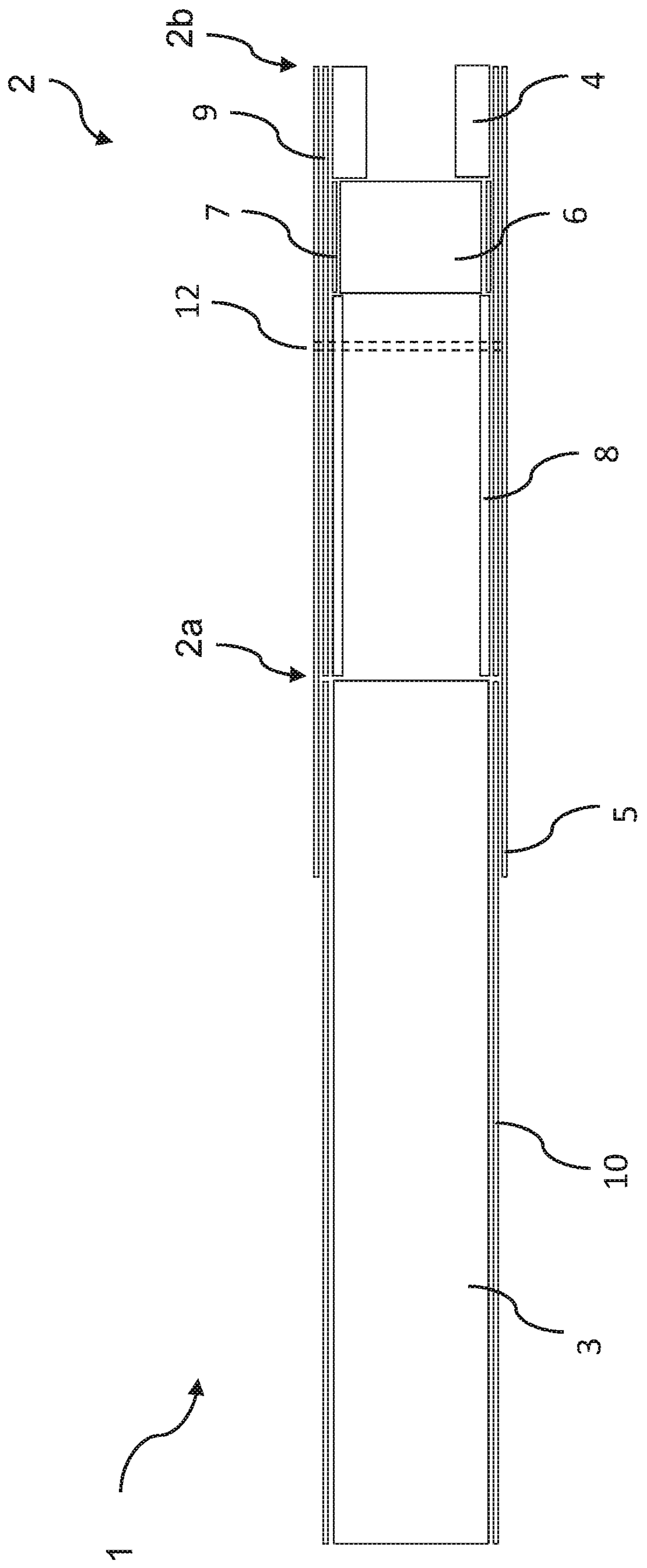
FIG. 1 is a side-on cross sectional view of an article for use with a non-combustible aerosol provision device, the article including a mouthpiece.

As used herein, the term "delivery system" is intended to encompass systems that deliver a substance to a user, and includes:

combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);

non-combustible aerosol provision systems that release compounds from an aerosolizable material without combusting the aerosolizable material, such as electronic cigarettes, tobacco heating products, and hybrid systems to generate aerosol using a combination of aerosolizable materials;

articles comprising aerosolizable material and configured to be used in one of these non-combustible aerosol provision systems; and aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energised so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosolizable material may for example comprise from about 50 wt %, 60 wt % or 70 wt % of amorphous solid, to about 90 wt %, 95 wt % or 100 wt % of amorphous solid.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

An aerosol modifying agent is a substance that is able to modify aerosol in use. The agent may modify aerosol in such a way as to create a physiological or sensory effect on the human body. Example aerosol modifying agents are flavorants and sensates. A sensate creates an organoleptic sensation that can be perceived through the senses, such as a cool or sour sensation.

A susceptor is material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

In one embodiment, the susceptor is in the form of a closed circuit. It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Articles, for instance those in the shape of rods, are often named according to the product length: "regular" (typically in the range 68-75 mm, e.g. from about 68 mm to about 72 mm), "short" or "mini" (68 mm or less), "king-size" (typically in the range 75-91 mm, e.g. from about 79 mm to about 88 mm), "long" or "super-king" (typically in the range 91-105 mm, e.g. from about 94 mm to about 101 mm) and "ultra-long" (typically in the range from about 110 mm to about 121 mm).

They are also named according to the product circumference: "regular" (about 23-25 mm), "wide" (greater than 25 mm), "slim" (about 22-23 mm), "demi-slim" (about 19-22 mm), "super-slim" (about 16-19 mm), and "micro-slim" (less than about 16 mm).

Accordingly, an article in a king-size, super-slim format will, for example, have a length of about 83 mm and a circumference of about 17 mm.

Each format may be produced with mouthpieces of different lengths. The mouthpiece length will be from about 30 mm to 50 mm. A tipping paper connects the mouthpiece to the aerosol generating material and will usually have a greater length than the mouthpiece, for example from 3 to 10 mm longer, such that the tipping paper covers the mouthpiece and overlaps the aerosol generating material, for instance in the form of a rod of substrate material, to connect the mouthpiece to the rod.

Articles and their aerosol generating materials and mouthpieces described herein can be made in, but are not limited to, any of the above formats.

The terms 'upstream' and 'downstream' used herein are relative terms defined in relation to the direction of mainstream aerosol drawn though an article or device in use.

The filamentary tow material described herein can comprise cellulose acetate fibre tow. The filamentary tow can also be formed using other materials used to form fibres, such as polyvinyl alcohol (PVOH), polylactic acid (PLA), polycaprolactone (PCL), poly(1-4 butanediol succinate) (PBS), poly(butylene adipate-co-terephthalate)(PBAT), starch based materials, cotton, aliphatic polyester materials and polysaccharide polymers or a combination thereof. The filamentary tow may be plasticized with a suitable plasticizer for the tow, such as triacetin where the material is cellulose acetate tow, or the tow may be nonplasticized. The tow can have any suitable specification, such as fibers having a 'Y' shaped or other cross section such as 'X' shaped, filamentary denier values between 2.5 and 15 denier per filament, for example between 8.0 and 11.0 denier per filament and total denier values of 5,000 to 50,000, for example between 10,000 and 40,000.

As used herein, the term "tobacco material" refers to any material comprising tobacco or derivatives or substitutes thereof. The term "tobacco material" may include one or more of tobacco, tobacco derivatives, expanded tobacco, reconstituted tobacco or tobacco substitutes. The tobacco material may comprise one or more of ground tobacco, tobacco fibre, cut tobacco, extruded tobacco, tobacco stem, tobacco lamina, reconstituted tobacco and/or tobacco extract.

As used herein, the terms "flavor" and "flavorant" refer to materials which, where local regulations permit, may be used to create a desired taste or aroma in a product for adult consumers. One or more flavors can be used as the aerosol modifying agent described herein.

They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In the figures described herein, like reference numerals are used to illustrate equivalent features, articles or components.

FIG. 1 is a side-on cross sectional view of an article 1 for use with a non-combustible aerosol provision device.

The article 1 comprises a mouthpiece 2, and a cylindrical rod of aerosol generating material 3, in the present case tobacco material, connected to the mouthpiece 2. The aerosol generating material 3 provides an aerosol when heated, for instance within a non-combustible aerosol provision device as described herein, for instance a non-combustible aerosol provision device comprising a coil, forming a system. In other embodiments the article 1 can include its own heat source, forming an aerosol provision system without requiring a separate aerosol provision device. In the present example, the article 1 has an outer circumference of about 21 mm (i.e. the article is in the demi-slim format). In embodiments, the article 1 has a rod of aerosol generating material having a circumference greater than 19 mm. This has been found to provide a sufficient circumference to generate an improved and sustained aerosol over a usual aerosol generation session preferred by consumers. As the article is heated, heat transfers through the rod of aerosol generating material 3 to volatize components of the rod, and circumferences greater than 19 mm have been found to be particularly effective at producing an aerosol in this way. Since the article is to be heated to release an aerosol, improved heating efficiency can be achieved using articles having circumferences of less than about 23 mm. To achieve improved aerosol via heating, while maintaining a suitable product length, rod circumferences of greater than 19 mm and less than 23 mm can be used. In some examples, the rod circumference can be between 20 mm and 22 mm, which has been found to provide a good balance between providing effective aerosol delivery while allowing for efficient heating.

The aerosol generating material 3, also referred to herein as an aerosol generating substrate 3, comprises at least one aerosol forming material. In the present example, the aerosol forming material is glycerol. In alternative examples, the aerosol forming material can be another material as described herein or a combination thereof. The aerosol forming material has been found to improve the sensory performance of the article, by helping to transfer compounds such as flavor compounds from the aerosol generating material to the consumer. However, an issue with adding such aerosol forming materials to the aerosol generating material within an article for use in a non-combustible aerosol provision system can be that, when the aerosol forming material is aerosolized upon heating, it can increase the mass of aerosol which is delivered by the article, and this increased mass can maintain a higher temperature as it passes through the mouthpiece. As it passes through the mouthpiece, the aerosol transfers heat into the mouthpiece and this warms the outer surface of the mouthpiece, including the area which comes into contact with the consumer's lips during use. The mouthpiece temperature can be significantly higher than consumers may be accustomed to when smoking, for instance, conventional cigarettes, and this can be an undesirable effect caused by the use of such aerosol forming materials.

The part of the mouthpiece which comes into contact with a consumer's lips has usually been a paper tube, which is either hollow or surrounds a cylindrical body of filter material.

As shown in FIG. 1, the mouthpiece 2 of the article 1 comprises an upstream end 2*a* adjacent to the aerosol generating substrate 3 and a downstream end 2*b* distal from the aerosol generating substrate 3. At the downstream end 2*b*, the mouthpiece 2 has a hollow tubular element 4 formed from filamentary tow. This has advantageously been found to significantly reduce the temperature of the outer surface of the mouthpiece 2 at the downstream end 2*b* of the mouthpiece which comes into contact with a consumer's mouth when the article 1 is in use. In addition, the use of the tubular element 4 has also been found to significantly reduce the temperature of the outer surface of the mouthpiece 2 even upstream of the tubular element 4. Without wishing to be bound by theory, it is hypothesized that this is due to the tubular element 4 channeling aerosol closer to the center of the mouthpiece 2, and therefore reducing the transfer of heat from the aerosol to the outer surface of the mouthpiece 2.

The outer circumference of the mouthpiece 2 is substantially the same as the outer circumference of the rod of aerosol generating material 3, such that there is a smooth transition between these components. In the present example, the outer circumference of the mouthpiece 2 is about 20.8 mm. A tipping paper 5 is wrapped around the full length of the mouthpiece 2 and over part of the rod of aerosol generating material 3 and has an adhesive on its inner surface to connect the mouthpiece 2 and rod 3. In the present example, the tipping paper 5 extends 5 mm over the rod of aerosol generating material 3 but it can alternatively extend between 3 mm and 10 mm over the rod 3, or between 4 mm and 6 mm, to provide a secure attachment between the mouthpiece 2 and rod 3. The tipping paper 5 can have a basis weight which is higher than the basis weight of plug wraps used in the article 1, for instance a basis weight of 40 gsm to 80 gsm, between 50 gsm and 70 gsm, and in the present example 58 gsm. These ranges of basis weights have been found to result in tipping papers having acceptable tensile strength while being flexible enough to wrap around the article 1 and adhere to itself along a longitudinal lap seam on the paper. The outer circumference of the tipping paper 5, once wrapped around the mouthpiece 2, is about 21 mm.

The "wall thickness" of the hollow tubular element 4 corresponds to the thickness of the wall of the tube 4 in a radial direction. This may be measured, for example, using a calliper. The wall thickness is advantageously greater than 0.9 mm, or 1.0 mm or greater. The wall thickness can be substantially constant around the entire wall of the hollow tubular element 4. However, where the wall thickness is not substantially constant, the wall thickness can be greater than 0.9 mm at any point around the hollow tubular element 4, or 1.0 mm or greater.

The length of the hollow tubular element 4 may be less than about 20 mm. The length of the hollow tubular element 4 may be less than about 15 mm or less than about 10 mm. In addition, or as an alternative, the length of the hollow tubular element 4 is at least about 5 mm. In some embodiments, the length of the hollow tubular element 4 is at least about 6 mm. In some embodiments, the length of the hollow tubular element 4 is from about 5 mm to about 20 mm, or from about 6 mm to about 10 mm, or from about 6 mm to about 8 mm, or about 6 mm, 7 mm or about 8 mm. In the present example, the length of the hollow tubular element 4 is 6 mm.

Preferably, the density of the hollow tubular element 4 is at least about 0.25 grams per cubic centimetre (g/cc), or at least about 0.3 g/cc. In some embodiments, the density of the hollow tubular element 4 is less than about 0.75 grams per cubic centimetre (g/cc), or less than 0.6 g/cc. In some embodiments, the density of the hollow tubular element 4 is between 0.25 and 0.75 g/cc, or between 0.3 and 0.6 g/cc, or between 0.4 g/cc and 0.6 g/cc or about 0.5 g/cc. These densities have been found to provide a good balance between improved firmness afforded by denser material and the lower heat transfer properties of lower density material. For the purposes of the present disclosure, the "density" of the hollow tubular element 4 refers to the density of the filamentary tow forming the element with any plasticizer incorporated. The density may be determined by dividing the total weight of the hollow tubular element 4 by the total volume of the hollow tubular element 4, wherein the total volume can be calculated using appropriate measurements of the hollow tubular element 4 taken, for example, using calipers. Where necessary, the appropriate dimensions may be measured using a microscope.

The filamentary tow forming the hollow tubular element 4 may have a total denier of less than 45,000, or less than 42,000. This total denier has been found to allow the formation of a tubular element 4 which is not too dense. The total denier can be at least 20,000, or at least 25,000. In some embodiments, the filamentary tow forming the hollow tubular element 4 has a total denier between 25,000 and 45,000, or between 35,000 and 45,000. The cross-sectional shape of the filaments of tow can be 'Y' shaped, although in other embodiments other shapes such as 'X' shaped filaments can be used.

The filamentary tow forming the hollow tubular element 4 may have a denier per filament of greater than 3. This denier per filament has been found to allow the formation of a tubular element 4 which is not too dense. The denier per filament may be at least 4, or at least 5. In some embodiments, the filamentary tow forming the hollow tubular element 4 has a denier per filament between 4 and 10, or between 4 and 9. In one example, the filamentary tow forming the hollow tubular element 4 has an 8Y40,000 tow formed from cellulose acetate and comprising 18%, for instance triacetin.

The hollow tubular element 4 can have an internal diameter of greater than 3.0 mm. Smaller diameters than this can result in increasing the velocity of aerosol passing though the mouthpiece 2 to the consumers mouth more than is desirable, such that the aerosol becomes too warm, for instance reaching temperatures greater than 40° C. or greater than 45° C. The hollow tubular element 4 can have an internal diameter of greater than 3.1 mm, or greater than 3.5 mm or 3.6 mm. In one embodiment, the internal diameter of the hollow tubular element 4 is about 3.9 mm.

The hollow tubular element 4 comprises from 15% to 22% by weight of plasticizer. For cellulose acetate tow, the plasticizer is preferably triacetin, although other plasticizers such as polyethelene glycol (PEG) can be used. The tubular element 4 comprises from 16% to 20% by weight of plasticizer, for instance about 17%, about 18% or about 19% plasticizer.

The pressure drop or difference (also referred to a resistance to draw) across the mouthpiece, for instance the part of the article 1 downstream of the aerosol generating material 3, may be less than about 40 mm $H_2O$. Such pressure drops have been found to allow sufficient aerosol, including desirable compounds such as flavor compounds, to pass through the mouthpiece 2 to the consumer. In embodiments, the pressure drop across the mouthpiece 2 is less than about 32 mm $H_2O$. In some embodiments, particularly improved aerosol has been achieved using a mouthpiece 2 having a pressure drop of less than 31 mm $H_2O$, for instance about 29 mm $H_2O$, about 28 mm $H_2O$ or about 27.5 mm $H_2O$. Alternatively or additionally, the mouthpiece pressure drop can be at least 10 mm $H_2O$, at least 15 mm $H_2O$ or at least 20 mm $H_2O$. In some embodiments, the mouthpiece pressure drop can be between about 15 mm $H_2O$ and 40 mm $H_2O$. These values enable the mouthpiece 2 to slow down the aerosol as it passes through the mouthpiece 2 such that the temperature of the aerosol has time to reduce before reaching the downstream end 2*b* of the mouthpiece 2.

The mouthpiece 2, in the present example, includes a body of material 6 upstream of the hollow tubular element 4, in this example adjacent to and in an abutting relationship with the hollow tubular element 4. The body of material 6 and hollow tubular element 4 each define a substantially cylindrical overall outer shape and share a common longitudinal axis. The body of material 6 is wrapped in a first plug wrap 7. The first plug wrap 7 can have a basis weight of less than 50 gsm, or between about 20 gsm and 40 gsm. The first plug wrap 7 can have a thickness of between 30 μm and 60 μm, or between 35 μm and 45 μm. The first plug wrap 7 can be a non-porous plug wrap, for instance having a permeability of less than 100 Coresta units, for instance less than 50 Coresta units. However, in other embodiments, the first plug wrap 7 can be a porous plug wrap, for instance having a permeability of greater than 200 Coresta Units.

The length of the body of material 6 can be less than about 15 mm or less than about 10 mm. In addition, or as an alternative, the length of the body of material 6 is at least about 5 mm. The length of the body of material 6 can be at least about 6 mm. In some embodiments, the length of the body of material 6 is from about 5 mm to about 15 mm, or from about 6 mm to about 12 mm, or from about 6 mm to about 12 mm, or about 6 mm, 7 mm, 8 mm, 9 mm or 10 mm. In the present example, the length of the body of material 6 is 10 mm.

In the present example, the body of material 6 is formed from filamentary tow. In the present example, the tow used in the body of material 6 has a denier per filament (d.p.f) of 8.4 and a total denier of 21,000. Alternatively, the tow can, for instance, have a denier per filament (d.p.f) of 9.5 and a total denier of 12,000. In the present example, the tow comprises plasticized cellulose acetate tow. The plasticizer used in the tow comprises about 7% by weight of the tow. In the present example, the plasticizer is triacetin. In other examples, different materials can be used to form the body of material 6. For instance, rather than tow, the body 6 can be formed from paper, for instance in a similar way to paper filters known for use in cigarettes. Alternatively, the body 6 can be formed from tows other than cellulose acetate, for instance polylactic acid (PLA), other materials described herein for filamentary tow or similar materials. The tow can be formed from cellulose acetate. The tow, whether formed from cellulose acetate or other materials, can have a d.p.f. of at least 5, or at least 6 or at least 7. These values of denier per filament provide a tow which has relatively coarse, thick fibres with a lower surface area which result in a lower pressure drop across the mouthpiece 2 than tows having lower d.p.f. values. To achieve a sufficiently uniform body of material 6, the tow can have a denier per filament of no more than 12 d.p.f., or no more than 11 d.p.f. or no more than 10 d.p.f.

The total denier of the tow forming the body of material 6 may be at most 30,000, or at most 28,000 or at most 25,000. These values of total denier provide a tow which takes up a reduced proportion of the cross sectional area of the mouthpiece 2 which results in a lower pressure drop across the mouthpiece 2 than tows having higher total denier values. For appropriate firmness of the body of material 6, the tow can have a total denier of at least 8,000 or at least 10,000. The denier per filament can be between 5 and 12 while the total denier is between 10,000 and 25,000. In some embodiments, the denier per filament is between 6 and 10 while the total denier is between 11,000 and 22,000. The cross-sectional shape of the filaments of tow are 'Y' shaped, although in other embodiments other shapes such as 'X' shaped filaments can be used, with the same d.p.f. and total denier values as provided herein.

In the present example the hollow tubular element 4 is a first hollow tubular element 4 and the mouthpiece includes a second hollow tubular element 8, also referred to as a cooling element, upstream of the first hollow tubular element 4. In the present example, the second hollow tubular element 8 is upstream of, adjacent to and in an abutting relationship with the body of material 6. The body of material 6 and second hollow tubular element 8 each define a substantially cylindrical overall outer shape and share a common longitudinal axis. The second hollow tubular element 8 is formed from a plurality of layers of paper which are parallel wound, with butted seams, to form the tubular element 8. In the present example, first and second paper layers are provided in a two-ply tube, although in other examples 3, 4 or more paper layers can be used forming 3, 4 or more ply tubes. Other constructions can be used, such as spirally wound layers of paper, cardboard tubes, tubes formed using a papier-mâché type process, molded or extruded plastic tubes or similar.

The second hollow tubular element 8 can also be formed using a stiff plug wrap and/or tipping paper as the second plug wrap 9 and/or tipping paper 5 described herein, meaning that a separate tubular element is not required. The stiff plug wrap and/or tipping paper is manufactured to have a rigidity that is sufficient to withstand the axial compressive forces and bending moments that might arise during manufacture and whilst the article 1 is in use. For instance, the stiff plug wrap and/or tipping paper can have a basis weight between 70 gsm and 120 gsm, or between 80 gsm and 110 gsm. Additionally or alternatively, the stiff plug wrap and/or tipping paper can have a thickness between 80 μm and 200 μm, or between 100 μm and 160 μm, or from 120 μm to 150 μm. It can be desirable for both the second plug wrap 9 and tipping paper 5 to have values in these ranges, to achieve an acceptable overall level of rigidity for the second hollow tubular element 8.

The second hollow tubular element 8 has a wall thickness, which can be measured in the same way as that of the first hollow tubular element 4, of at least about 100 μm and up to about 1.5 mm,—between 100 μm and 1 mm or between 150 μm and 500 μm, or about 300 μm. In the present example, the second hollow tubular element 8 has a wall thickness of about 290 μm.

The length of the second hollow tubular element 8 can be less than about 50 mm or less than about 40 mm or less than about 30 mm. In addition, or as an alternative, the length of the second hollow tubular element 8 is preferably at least about 10 mm or is at least about 15 mm. In some embodiments, the length of the second hollow tubular element 8 is from about 20 mm to about 30 mm, from about 22 mm to about 28 mm, from about 24 to about 26 mm, or about 25 mm. In the present example, the length of the second hollow tubular element 8 is 25 mm.

The second hollow tubular element 8 is located around and defines an air gap within the mouthpiece 2 which acts as a cooling segment. The air gap provides a chamber through which heated volatilized components generated by the aerosol generating material 3 flow. The second hollow tubular element 8 is hollow to provide a chamber for aerosol accumulation yet rigid enough to withstand axial compressive forces and bending moments that might arise during manufacture and whilst the article 1 is in use. The second hollow tubular element 8 provides a physical displacement between the aerosol generating material 3 and the body of material 6. The physical displacement provided by the second hollow tubular element 8 will provide a thermal gradient across the length of the second hollow tubular element 8.

In some embodiments, the mouthpiece 2 comprises a cavity having an internal volume greater than 450 $mm^3$. Providing a cavity of at least this volume has been found to enable the formation of an improved aerosol. Such a cavity size provides sufficient space within the mouthpiece 2 to allow heated volatilized components to cool, therefore allowing the exposure of the aerosol generating material 3 to higher temperatures than would otherwise be possible, since they may result in an aerosol which is too warm. In the present example, the cavity is formed by the second hollow tubular element 8, but in alternative arrangements it could be formed within a different part of the mouthpiece 2. In some embodiments, the mouthpiece 2 comprises a cavity, for instance formed within the second hollow tubular element 8, having an internal volume greater than 500 $mm^3$, or greater than 550 $mm^3$, allowing further improvement of the aerosol. In some examples, the internal cavity comprises a volume of between about 550 $mm^3$ and about 750 $mm^3$, for instance about 600 $mm^3$ or 700 $mm^3$.

The second hollow tubular element 8 can be configured to provide a temperature differential of at least 40 degrees Celsius between a heated volatilized component entering a first, upstream end of the second hollow tubular element 8 and a heated volatilized component exiting a second, downstream end of the second hollow tubular element 8. The second hollow tubular element 8 is configured to provide a temperature differential of at least 60 degrees Celsius, at least 80 degrees Celsius or at least 100 degrees Celsius between a heated volatilized component entering a first, upstream end of the second hollow tubular element 8 and a heated volatilized component exiting a second, downstream end of the second hollow tubular element 8. This temperature differential across the length of the second hollow tubular element 8 protects the temperature sensitive body of material 6 from the high temperatures of the aerosol generating material 3 when it is heated.

In alternative articles, the second hollow tubular element 8 can be replaced with an alternative cooling element, for instance an element formed from a body of material which allows aerosol to pass through it longitudinally, and which also performs the function of cooling the aerosol.

In the present example, the first hollow tubular element 4, body of material 6 and second hollow tubular element 8 are combined using a second plug wrap 9 which is wrapped around all three sections. In embodiments, the second plug wrap 9 has a basis weight of less than 50 gsm, or between about 20 gsm and 45 gsm. In embodiments, the second plug wrap 9 has a thickness of between 30 μm and 60 μm, or between 35 μm and 45 μm. The second plug wrap 9 can be a non-porous plug wrap having a permeability of less than 100 Coresta Units, for instance less than 50 Coresta Units. However, in alternative embodiments, the second plug wrap 9 can be a porous plug wrap, for instance having a permeability of greater than 200 Coresta Units.

In the present example, the aerosol generating material 3 is wrapped in a wrapper 10. The wrapper 10 can, for instance, be a paper or paper-backed foil wrapper. In the present example, the wrapper 10 is substantially impermeable to air. In alternative embodiments, the wrapper 10 preferably has a permeability of less than 100 Coresta Units, or less than 60 Coresta Units. It has been found that low permeability wrappers, for instance having a permeability of less than 100 Coresta Units, or less than 60 Coresta Units, result in an improvement in the aerosol formation in the aerosol generating material 3. Without wishing to be bound by theory, it is hypothesized that this is due to reduced loss of aerosol compounds through the wrapper 10. The permeability of the wrapper 10 can be measured in accordance with ISO 2965:2009 concerning the determination of air permeability for materials used as cigarette papers, filter plug wrap and filter joining paper.

In the present embodiment, the wrapper 10 comprises aluminium foil. Aluminium foil has been found to be particularly effective at enhancing the formation of aerosol within the aerosol generating material 3. In the present example, the aluminium foil has a metal layer having a thickness of about 6 μm. In the present example, the aluminium foil has a paper backing. However, in alternative arrangements, the aluminium foil can be other thicknesses, for instance between 4 μm and 16 μm in thickness. The aluminium foil also need not have a paper backing, but could have a backing formed from other materials, for instance to help provide an appropriate tensile strength to the foil, or it could have no backing material. Metallic layers or foils other than aluminium can also be used. The total thickness of the wrapper can be between 20 μm and 60 μm, or between 30 μm and 50 μm, which can provide a wrapper having appropriate structural integrity and heat transfer characteristics. The tensile force which can be applied to the wrapper before it breaks can be greater than 3,000 grams force, for instance between 3,000 and 10,000 grams force or between 3,000 and 4,500 grams force.

The article has a ventilation level of about 75% of the aerosol drawn through the article. In alternative embodiments, the article can have a ventilation level of between 50% and 80% of aerosol drawn through the article, for instance between 65% and 75%. Ventilation at these levels helps to slow down the flow of aerosol drawn through the mouthpiece 2 and thereby enable the aerosol to cool sufficiently before it reaches the downstream end **2*b* of the mouthpiece 2. The ventilation is provided directly into the mouthpiece 2 of the article 1. In the present example, the ventilation is provided into the second hollow tubular element 8, which has been found to be particularly beneficial in assisting with the aerosol generation process. The ventilation is provided via first and second parallel rows of perforations 12, in the present case formed as laser perforations, at positions 17.925 mm and 18.625 mm respectively from the downstream, mouth-end 2***b* of the mouthpiece 2. These perforations pass though the tipping paper 5, second plug wrap 9 and second hollow tubular element 8. In alternative embodiments, the ventilation can be provided into the mouthpiece at other locations, for instance into the body of material 6 or first tubular element 4.

In the present example, the aerosol forming material added to the aerosol generating substrate 3 comprises 14% by weight of the aerosol generating substrate 3. In embodiments, the aerosol forming material comprises at least 5% by weight of the aerosol generating substrate, or at least 10%. In embodiments, the aerosol forming material comprises less than 25% by weight of the aerosol generating substrate, or less than 20%, for instance between 10% and 20%, between 12% and 18% or between 13% and 16%.

In embodiments, the aerosol generating material 3 is provided as a cylindrical rod of aerosol generating material. Irrespective of the form of the aerosol generating material, it has a length of about 10 mm to 100 mm. In some embodiments, the length of the aerosol generating material is preferably in the range about 25 mm to 50 mm, in the range about 30 mm to 45 mm, or about 30 mm to 40 mm.

The volume of aerosol generating material 3 provided can vary from about 200 $mm^3$ to about 4300 $mm^3$, from about 500 $mm^3$ to 1500 $mm^3$, or from about 1000 $mm^3$ to about 1300 $mm^3$. The provision of these volumes of aerosol generating material, for instance from about 1000 $mm^3$ to about 1300 $mm^3$, has been advantageously shown to achieve a superior aerosol, having a greater visibility and sensory performance compared to that achieved with volumes selected from the lower end of the range.

The mass of aerosol generating material 3 provided can be greater than 200 mg, for instance from about 200 mg to 400 mg, from about 230 mg to 360 mg, or from about 250 mg to 360 mg. It has been advantageously found that providing a higher mass of aerosol generating material results in improved sensory performance compared to aerosol generated from a lower mass of tobacco material.

In embodiments, the aerosol generating material or substrate is formed from tobacco material as described herein, which includes a tobacco component.

In the tobacco material described herein, the tobacco component preferably contains paper reconstituted tobacco. The tobacco component may also contain leaf tobacco, extruded tobacco, and/or bandcast tobacco.

The aerosol generating material 3 can comprise reconstituted tobacco material having a density of less than about 700 milligrams per cubic centimetre (mg/cc). Such tobacco material has been found to be particularly effective at providing an aerosol generating material which can be heated quickly to release an aerosol, as compared to denser materials. For instance, the inventors tested the properties of various aerosol generating materials, such as bandcast reconstituted tobacco material and paper reconstituted tobacco material, when heated. It was found that, for each given aerosol generating material, there is a particular zero heat flow temperature below which net heat flow is endothermic, in other words more heat enters the material than leaves the material, and above which net heat flow is exothermic, in other words more heat leaves the material than enters the material, while heat is applied to the material. Materials having a density less than 700 mg/cc had a lower zero heat flow temperature. Since a significant portion of the heat flow out of the material is via the formation of aerosol, having a lower zero heat flow temperature has a beneficial effect on the time it takes to first release aerosol from the aerosol generating material. For instance, aerosol generating materials having a density of less than 700 mg/cc were found to have a zero heat flow temperature of less than 164° C., as compared to materials with a density over 700 mg/cc, which had zero heat flow temperatures greater than 164° C.

The density of the aerosol generating material also has an impact on the speed at which heat conducts through the material, with lower densities, for instance those below 700 mg/cc, conducting heat more slowly through the material, and therefore enabling a more sustained release of aerosol.

In embodiments, the aerosol generating material 3 comprises reconstituted tobacco material having a density of less than about 700 mg/cc, for instance paper reconstituted tobacco material or comprises reconstituted tobacco material having a density of less than about 600 mg/cc. Alternatively or in addition, the aerosol generating material 3 comprises reconstituted tobacco material having a density of at least 350 mg/cc, which is considered to allow for a sufficient amount of heat conduction through the material.

The tobacco material may be provided in the form of cut rag tobacco. The cut rag tobacco can have a cut width of at least 15 cuts per inch (about 5.9 cuts per cm, equivalent to a cut width of about 1.7 mm). In embodiments, the cut rag tobacco has a cut width of at least 18 cuts per inch (about 7.1 cuts per cm, equivalent to a cut width of about 1.4 mm), or at least 20 cuts per inch (about 7.9 cuts per cm, equivalent to a cut width of about 1.27 mm). In one example, the cut rag tobacco has a cut width of 22 cuts per inch (about 8.7 cuts per cm, equivalent to a cut width of about 1.15 mm). In embodiments, the cut rag tobacco has a cut width at or below 40 cuts per inch (about 15.7 cuts per cm, equivalent to a cut width of about 0.64 mm). Cut widths between 0.5 mm and 2.0 mm, for instance between 0.6 mm and 1.5 mm, or between 0.6 mm and 1.7 mm, have been found to result in tobacco material which is preferable in terms of surface area to volume ratio, particularly when heated, and the overall density and pressure drop of the substrate 3. The cut rag tobacco can be formed from a mixture of forms of tobacco material, for instance a mixture of one or more of paper reconstituted tobacco, leaf tobacco, extruded tobacco and bandcast tobacco. In embodiments the tobacco material comprises paper reconstituted tobacco or a mixture of paper reconstituted tobacco and leaf tobacco.

In the tobacco material described herein, the tobacco material may contain a filler component. The filler component is generally a non-tobacco component, that is, a component that does not include ingredients originating from tobacco. The filler component may be a non-tobacco fiber such as wood fiber or pulp or wheat fiber. The filler component may also be an inorganic material such as chalk, perlite, vermiculite, diatomaceous earth, colloidal silica, magnesium oxide, magnesium sulphate, magnesium carbonate. The filler component may also be a non-tobacco cast material or a non-tobacco extruded material. The filler component may be present in an amount of 0 to 20% by weight of the tobacco material, or in an amount of from 1 to 10% by weight of the composition. In some embodiments, the filler component is absent.

In the tobacco material described herein, the tobacco material contains an aerosol forming material. In this context, an "aerosol forming material" is an agent that promotes the generation of an aerosol. An aerosol forming material may promote the generation of an aerosol by promoting an initial vaporization and/or the condensation of a gas to an inhalable solid and/or liquid aerosol. In some embodiments, an aerosol forming material may improve the delivery of flavor from the aerosol generating material. In general, any suitable aerosol forming material or agents may be included in the aerosol generating material of the disclosure, including those described herein. Other suitable aerosol forming materials include, but are not limited to: a polyol such as sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate. In some embodiments, the aerosol forming material may be glycerol, propylene glycol, or a mixture of glycerol and propylene glycol. Glycerol may be present in an amount of from 10 to 20% by weight of the tobacco material, for example 13 to 16% by weight of the composition, or about 14% or 15% by weight of the composition. Propylene glycol, if present, may be present in an amount of from 0.1 to 0.3% by weight of the composition.

The aerosol forming material may be included in any component, for example any tobacco component, of the tobacco material, and/or in the filler component, if present. Alternatively or additionally the aerosol forming material may be added to the tobacco material separately. In either case, the total amount of the aerosol forming material in the tobacco material can be as defined herein.

The tobacco material can contain between 10% and 90% by weight tobacco leaf, wherein the aerosol forming material is provided in an amount of up to about 10% by weight of the leaf tobacco. To achieve an overall level of aerosol forming material between 10% and 20% by weight of the tobacco material, it has been advantageously found that this can be added in higher weight percentages to the another component of the tobacco material, such as reconstituted tobacco material.

The tobacco material described herein contains nicotine. The nicotine content is from 0.5 to 1.75% by weight of the tobacco material, and may be, for example, from 0.8 to 1.5% by weight of the tobacco material. Additionally or alternatively, the tobacco material contains between 10% and 90% by weight tobacco leaf having a nicotine content of greater than 1.5% by weight of the tobacco leaf. It has been advantageously found that using a tobacco leaf with nicotine content higher than 1.5% in combination with a lower nicotine base material, such as paper reconstituted tobacco, provides a tobacco material with an appropriate nicotine level but better sensory performance than the use of paper reconstituted tobacco alone. The tobacco leaf, for instance cut rag tobacco, can, for instance, have a nicotine content of between 1.5% and 5% by weight of the tobacco leaf.

The tobacco material described herein can contain an aerosol modifying agent, such as any of the flavors described herein. In one embodiment, the tobacco material contains menthol, forming a mentholated article. The tobacco material can comprise from 3 mg to 20 mg of menthol, between 5 mg and 18 mg or between 8 mg and 16 mg of menthol. In the present example, the tobacco material comprises 16 mg of menthol. The tobacco material can contain between 2% and 8% by weight of menthol, between 3% and 7% by weight of menthol or between 4% and 5.5% by weight of menthol. In one embodiment, the tobacco material includes 4.7% by weight of menthol. Such high levels of menthol loading can be achieved using a high percentage of reconstituted tobacco material, for instance greater than 50% of the tobacco material by weight. Alternatively or additionally, the use of a high volume of aerosol generating material, for instance tobacco material, can increase the level of menthol loading that can be achieved, for instance where greater than about 500 mm3 or suitably more than about 1000 mm3 of aerosol generating material, such as tobacco material, are used.

In the compositions described herein, where amounts are given in % by weight, for the avoidance of doubt this refers to a dry weight basis, unless specifically indicated to the contrary. Thus, any water that may be present in the tobacco material, or in any component thereof, is entirely disregarded for the purposes of the determination of the weight %. The water content of the tobacco material described herein may vary and may be, for example, from 5 to 15% by weight. The water content of the tobacco material described herein may vary according to, for example, the temperature, pressure and humidity conditions at which the compositions are maintained. The water content can be determined by Karl-Fisher analysis, as known to those skilled in the art. On the other hand, for the avoidance of doubt, even when the aerosol forming material is a component that is in liquid phase, such as glycerol or propylene glycol, any component other than water is included in the weight of the tobacco material. However, when the aerosol forming material is provided in the tobacco component of the tobacco material, or in the filler component (if present) of the tobacco material, instead of or in addition to being added separately to the tobacco material, the aerosol forming material is not included in the weight of the tobacco component or filler component, but is included in the weight of the "aerosol forming material" in the weight % as defined herein. All other ingredients present in the tobacco component are included in the weight of the tobacco component, even if of non-tobacco origin (for example non-tobacco fibres in the case of paper reconstituted tobacco).

In an embodiment, the tobacco material comprises the tobacco component as defined herein and the aerosol forming material as defined herein. In an embodiment, the tobacco material consists essentially of the tobacco component as defined herein and the aerosol forming material as defined herein. In an embodiment, the tobacco material consists of the tobacco component as defined herein and the aerosol forming material as defined herein.

Paper reconstituted tobacco is present in the tobacco component of the tobacco material described herein in an amount of from 10% to 100% by weight of the tobacco component. In embodiments, the paper reconstituted tobacco is present in an amount of from 10% to 80% by weight, or 20% to 70% by weight, of the tobacco component. In a further embodiment, the tobacco component consists essentially of, or consists of, paper reconstituted tobacco. In embodiments, leaf tobacco is present in the tobacco component of the tobacco material in an amount of from at least 10% by weight of the tobacco component. For instance, leaf tobacco can be present in an amount of at least 10% by weight of the tobacco component, while the remainder of the tobacco component comprises paper reconstituted tobacco, bandcast reconstituted tobacco, or a combination of bandcast reconstituted tobacco and another form of tobacco such as tobacco granules.

Paper reconstituted tobacco refers to tobacco material formed by a process in which tobacco feedstock is extracted with a solvent to afford an extract of solubles and a residue comprising fibrous material, and then the extract (usually after concentration, and optionally after further processing) is recombined with fibrous material from the residue (usually after refining of the fibrous material, and optionally with the addition of a portion of non-tobacco fibers) by deposition of the extract onto the fibrous material. The process of recombination resembles the process for making paper.

The paper reconstituted tobacco may be any type of paper reconstituted tobacco that is known in the art. In a particular embodiment, the paper reconstituted tobacco is made from a feedstock comprising one or more of tobacco strips, tobacco stems, and whole leaf tobacco. In a further embodiment, the paper reconstituted tobacco is made from a feedstock consisting of tobacco strips and/or whole leaf tobacco, and tobacco stems. However, in other embodiments, scraps, fines and winnowings can alternatively or additionally be employed in the feedstock.

The paper reconstituted tobacco for use in the tobacco material described herein may be prepared by methods which are known to those skilled in the art for preparing paper reconstituted tobacco.

Figure 2A:
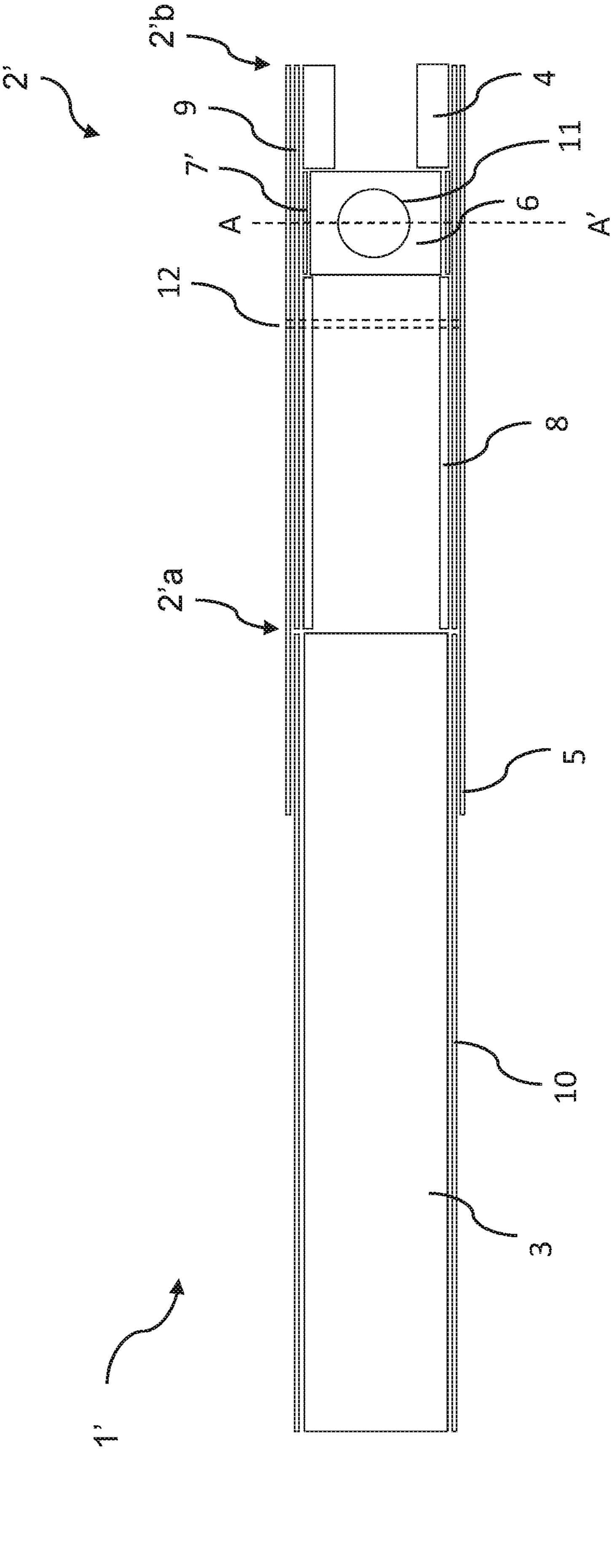
FIG. 2*a* is a side-on cross sectional view of a further article for use with a non-combustible aerosol provision device, in this example the article including a capsule-containing mouthpiece.
Figure 2B:
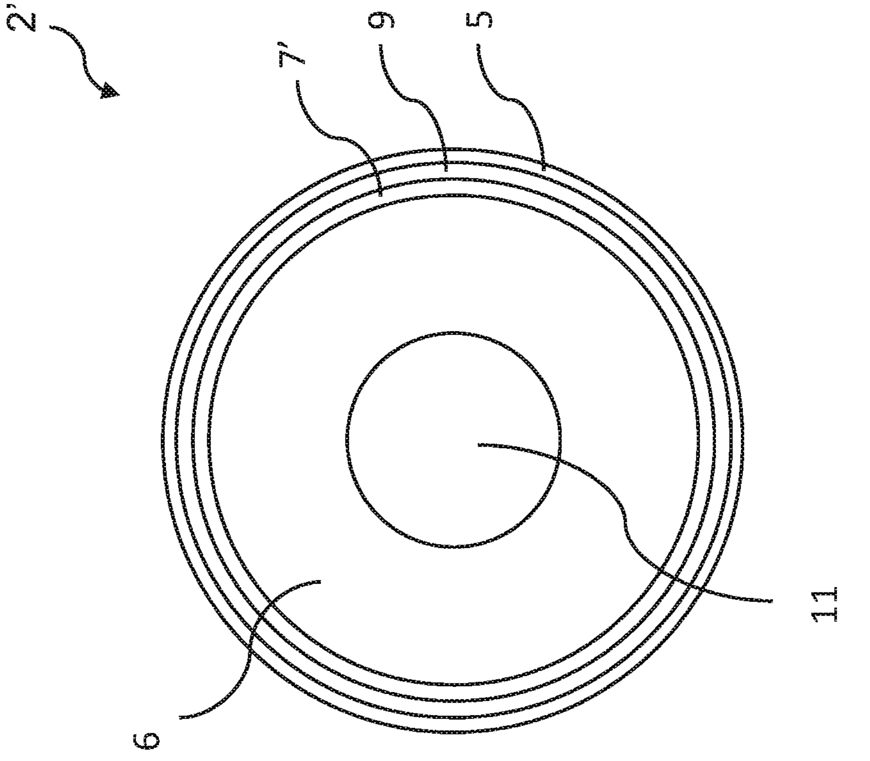
FIG. 2*b* is a cross sectional view of the capsule-containing mouthpiece shown in FIG. 2*a;*

FIG. 2*a* is a side-on cross sectional view of a further article 1' including a capsule-containing mouthpiece 2'. FIG. 2*b* is a cross sectional view of the capsule-containing mouthpiece shown in FIG. 2*a* through the line A-A' thereof. Article 1' and capsule-containing mouthpiece 2' are the same as the article 1 and mouthpiece 2 illustrated in FIG. 1, except that an aerosol modifying agent is provided within the body of material 6, in the present example in the form of a capsule 11, and that an oil-resistant first plug wrap 7' surrounds the body of material 6. In other examples, the aerosol modifying agent can be provided in other forms, such as material injected into the body of material 6 or provided on a thread, for instance the thread carrying a flavorant or other aerosol modifying agent, which may also be disposed within the body of material 6.

The capsule 11 can comprise a breakable capsule, for instance a capsule which has a solid, frangible shell surrounding a liquid payload. In the present example, a single capsule 11 is used. The capsule 11 is entirely embedded within the body of material 6. In other words, the capsule 11 is completely surrounded by the material forming the body 6. In other examples, a plurality of breakable capsules may be disposed within the body of material 6, for instance 2, 3 or more breakable capsules. The length of the body of material 6 can be increased to accommodate the number of capsules required. In examples where a plurality of capsules is used, the individual capsules may be the same as each other, or may differ from one another in terms of size and/or capsule payload. In other examples, multiple bodies of material 6 may be provided, with each body containing one or more capsules.

The capsule 11 has a core-shell structure. In other words, the capsule 11 comprises a shell encapsulating a liquid agent, for instance a flavorant or other agent, which can be any one of the flavorants or aerosol modifying agents described herein. The shell of the capsule can be ruptured by a user to release the flavorant or other agent into the body of material 6. The first plug wrap 7' can comprise a barrier coating to make the material of the plug wrap substantially impermeable to the liquid payload of the capsule 11. Alternatively or in addition, the second plug wrap 9 and/or tipping paper 5 can comprise a barrier coating to make the material of that plug wrap and/or tipping paper substantially impermeable to the liquid payload of the capsule 11.

In the present example, the capsule 11 is spherical and has a diameter of about 3 mm. In other examples, other shapes and sizes of capsule can be used. The total weight of the capsule 11 may be in the range about 10 mg to about 50 mg.

In the present example, the capsule 11 is located at a longitudinally central position within the body of material 6. That is, the capsule 11 is positioned so that its center is 4 mm from each end of the body of material 6. In other examples, the capsule 11 can be located at a position other than a longitudinally central position in the body of material 6, i.e. closer to the downstream end of the body of material 6 than the upstream end, or closer to the upstream end of the body of material 6 than the downstream end. Preferably, the mouthpiece 2' is configured so that the capsule 11 and the ventilation holes 12 are longitudinally offset from each other in the mouthpiece 2'.

A cross section of the mouthpiece 2' is shown in FIG. 2*b*, this being taken through line A-A' of FIG. 2*a*. FIG. 2*b* shows the capsule 11, the body of material 6, the first and second plug wraps 7', 9 and the tipping paper 5. In the present example, the capsule 11 is d on the longitudinal axis (not shown) of the mouthpiece 2'. The first and second plug wraps 7', 9 and tipping 5 are arranged concentrically around the body of material 6.

The breakable capsule 11 has a core-shell structure. That is, the encapsulating material or barrier material creates a shell around a core that comprises the aerosol modifying agent. The shell structure hinders migration of the aerosol modifying agent during storage of the article 1' but allows controlled release of the aerosol modifying agent, also referred to as an aerosol modifier, during use.

In some cases, the barrier material (also referred to herein as the encapsulating material) is frangible. The capsule is crushed or otherwise fractured or broken by the user to release the encapsulated aerosol modifier. Typically, the capsule is broken immediately prior to heating being initiated but the user can select when to release the aerosol modifier. The term "breakable capsule" refers to a capsule, wherein the shell can be broken by means of a pressure to release the core; more specifically the shell can be ruptured under the pressure imposed by the user's fingers when the user wants to release the core of the capsule.

In some cases, the barrier material is heat resistant. That is to say, in some cases, the barrier will not rupture, melt or otherwise fail at the temperature reached at the capsule site during operation of the aerosol provision device. Illustratively, a capsule located in a mouthpiece may be exposed to temperatures in the range of 30° C. to 100° C. for example, and the barrier material may continue to retain the liquid core up to at least about 50° C. to 120° C.

In other cases, the capsule releases the core composition on heating, for example by melting of the barrier material or by capsule swelling leading to rupture of the barrier material.

The total weight of a capsule may be in the range of about 1 mg to about 100 mg, suitably about 5 mg to about 60 mg, about 8 mg to about 50 mg, about 10 mg to about 20 mg, or about 12 mg to about 18 mg.

The total weight of the core formulation may be in the range of about 2 mg to about 90 mg, suitably about 3 mg to about 70 mg, about 5 mg to about 25 mg, about 8 mg to about 20 mg, or about 10 mg to about 15 mg.

The capsule according to the invention comprises a core as described above, and a shell. The capsules may present a crush strength from about 4.5 N to about 40 N from about 5 N to about 30 N or to about 28 N (for instance about 9.8 N to about 24.5 N). The capsule burst strength can be measured when the capsule is removed from the body of material 6 and using a force gauge to measure the force at which the capsule bursts when pressed between two flat metal plates. A suitable measurement device is the Sauter FK 50 force gauge with a flat headed attachment, which can be used to crush the capsule against a flat, hard surface having a surface similar to the attachment.

The capsules may be substantially spherical and have a diameter of at least about 0.4 mm, 0.6 mm, 0.8 mm, 1.0 mm, 2.0 mm, 2.5 mm, 2.8 mm or 3.0 mm. The diameter of the capsules may be less than about 10.0 mm, 8.0 mm, 7.0 mm, 6.0 mm, 5.5 mm, 5.0 mm, 4.5 mm, 4.0 mm, 3.5 mm or 3.2 mm. Illustratively, the capsule diameter may be in the range of about 0.4 mm to about 10.0 mm, about 0.8 mm to about 6.0 mm, about 2.5 mm to about 5.5 mm or about 2.8 mm to about 3.2 mm. In some cases, the capsule may have a diameter of about 3.0 mm. These sizes are particularly suitable for incorporation of the capsule into an article as described herein.

The cross-sectional area of the capsule 11 at its largest cross sectional area is in some embodiments less than 28% of the cross sectional area of the portion of the mouthpiece 2' in which the capsule 11 is provided, less than 27% or less than 25%. For instance, for the spherical capsule having a diameter of 3.0 mm, the largest cross sectional area of the capsule is 7.07 $mm^2$. For the mouthpiece 2' having a circumference of 21 mm as described herein, the body of material 6 has an outer circumference of 20.8 mm, and the radius of this component will be 3.31 mm, corresponding to a cross sectional area of 34.43 $mm^2$. The capsule cross sectional area is, in this example, 20.5% of the cross-sectional area of the mouthpiece 2'. As another example, if the capsule had a diameter of 3.2 mm, its largest cross sectional area would be 8.04 $mm^2$. In this case, the cross sectional area of the capsule would be 23.4% of the cross sectional area of the body of material 6. A capsule with a largest cross sectional area less than 28% of the cross sectional area of the portion of the mouthpiece 2' in which the capsule 11 is provided has the advantage that the pressure drop across the mouthpiece 2' is reduced as compared to capsules with larger cross sectional areas and adequate space remains around the capsule for aerosol to pass without the body of material 6 removing significant amounts of the aerosol mass as it passes through the mouthpiece 2'.

In embodiments the pressure drop or difference (also referred to a resistance to draw) across the article, measured as the open pressure drop (i.e. with the ventilation openings open), reduces by less than 8 mm $H_2O$ when the capsule is broken or reduces by less than 6 mm $H_2O$ or less than 5 mm $H_2O$. These values are measured as the average achieved by at least 80 articles made to the same design. Such small changes in pressure drop mean that other aspects of the product design, such as setting the correct ventilation level for a given product pressure drop, can be achieved irrespective of whether or not the consumer chooses to break the capsule.

In some embodiments, when the aerosol generating material 3 is heated to provide an aerosol, for instance within a non-combustible aerosol provision device as described herein, the part of the mouthpiece 2 in which the capsule is located reaches a temperature of between 58 and 70 degrees Centigrade during use of the system to generate an aerosol. As a result of this temperature, the capsule contents are warmed sufficiently to promote volatization of the capsule contents, for instance an aerosol modifying agent, into the aerosol formed by the system as the aerosol passes through the mouthpiece 2. Warming the content of the capsule 11 can take place, for instance, before the capsule 11 has been broken, such that when the capsule 11 is broken, its contents are more readily released into the aerosol passing through the mouthpiece 2. Alternatively, the content of the capsule 11 can be warmed to this temperature after the capsule 11 has been broken, again resulting in the increased release of the content into the aerosol. Advantageously, mouthpiece temperatures in the range of 58 to 70 degrees Centigrade have been found to be high enough that the capsule content can be more readily released, but low enough that the outer surface of the portion of the mouthpiece 2 in which the capsule is located does not reach an uncomfortable temperature for the consumer to touch in order to burst the capsule 11 by squeezing on the mouthpiece 2.

The temperature of the part of the mouthpiece 2 at which the capsule 11 is located can be measured using a digital thermometer with a penetration probe, arranged such that the probe enters the mouthpiece 2 through a wall of the mouthpiece 2 (forming a seal to limit the amount of external air which could leak into the mouthpiece around the probe) and is located close to the location of the capsule 11. Similarly, a temperature probe can be placed on the outer surface of the mouthpiece 2 to measure the temperature of the outer surface.

Table 1.0 below shows the temperature at the location of the capsule in the mouthpiece 2 of an article used in an aerosol provision system during the first 5 puffs. Data is provided for an article when heated using a coil heating device as described herein with reference to FIGS. 3 to 7 using a 'standard' heating profile and for the same article when heated using the same device using a 'boost' heating profile. The 'boost' heating profile is user selectable and allows a higher heating temperature to be achieved.

As shown in Table 1.0, the temperature of the mouthpiece 2 at the capsule 11 location reaches a maximum temperature of 61.5° C. under the 'standard' heating profile and a maximum of 63.8° C. under the 'boost' heating profile. A maximum temperature in the range of 58° C. to 70° C., preferably in the range of 59° C. to 65° C. and more preferably in the range of 60° C. to 65° C. has been found to be particularly advantageous in relation to helping to volatize the contents of the capsule 11 while maintaining a suitable outer surface temperature of the mouthpiece 2.

TABLE 1.0

| Puff Number | T° C. at capsule location in coil heating device under 'standard' heating profile | T° C. at capsule location in coil heating device under 'boost' heating profile |
|---|---|---|
| 1 | 58.5 | 54.7 |
| 2 | 56.5 | 60.5 |
| 3 | 61.5 | 63.8 |
| 4 | 57.2 | 53.0 |
| 5 | 52.9 | 46.7 |

The capsule 11 is breakable by external force applied to the mouthpiece 2, for instance by a consumer using their fingers or other mechanism to squeeze the mouthpiece 2. As described above, the part of the mouthpiece in which the capsule is located is arrange to reach a temperature of greater than 58° C. during use of the aerosol provision system to generate an aerosol. In embodiments, the burst strength of the capsule 11 when located within the mouthpiece 2 and prior to heating of the aerosol generating material 3 is between 1500 and 4000 grams force. In embodiments, the burst strength of the capsule 11 when located within the mouthpiece 2 and within 30 seconds of use of the aerosol provision system to generate an aerosol is between 1000 and 4000 grams force. Accordingly, despite being subjected to a temperature above 58° C., for instance between 58° C. to 70° C., the capsule 11 is able to maintain a burst strength within a range which has been found to enable the capsule 11 to be readily crushable by a consumer, while providing the consumer with sufficient tactile feedback that the capsule 11 has been broken. Maintaining such a burst strength is achieved by selecting an appropriate gelling agent for the capsule, as described herein, such as a polysaccharide including, for instance, gum Arabic, gellan gum, acacia gum, xanthan gums or carrageenans, alone or in combination with gelatine. In addition, a suitable wall thickness for the capsule shell should be selected.

Suitably, the burst strength of the capsule when located within the mouthpiece and prior to heating of the aerosol generating material is between 2000 and 3500 grams force, or between 2500 and 3500 grams force. Suitably, the burst strength of the capsule when located within the mouthpiece and within 30 s of use of the system to generate an aerosol is between 1500 and 4000 grams force, or between 1750 and 3000 grams force. In one example, the average burst strength of the capsule when located within the mouthpiece and prior to heating of the aerosol generating material is about 3175 grams force and the average burst strength of the capsule when located within the mouthpiece and within 30 s of use of the system to generate an aerosol is about 2345 grams force.

The burst strength of the capsule can be tested using a force measuring instrument such as a Texture Analyser. For the present burst strengths, a Type TA.XTPlus Texture Analyser was used with a circular shaped metal probe having a 6 mm diameter d on the location of the capsule (i.e. 12 mm from the mouth end of the mouthpiece 2). The test speed of the probe was 0.3 mm/second, while a pre-test speed of 5.00 mm/second was used and a post-test speed of 10 mm/second. The force used was 5000 g. The articles tested were drawn on using a Borgwaldt A14 Syringe drive Unit following the known Health Canada Intense puffing regime (55 ml puff volume applied for 2 seconds duration every 30 seconds) using standard testing equipment. Three puffs were performed using this puffing regime and the capsule burst strength was measured within 30 seconds of the third puff. The article tested was equivalent to the article 1 illustrated in FIGS. 1*a* and 1*b* and described in further detail below, except that an 8 mm hollow tubular element 4 was provided at the mouth-end formed from two layers of paper adhered together, each parallel wrapped with abutting seams and having a total thickness of 300 μm. The capsule was a 3 mm diameter capsule located within an 8 mm long body of cellulose acetate tow having a tow specification of 9.5Y12,000 and a target 9% triacetin plasticizer.

The barrier material may comprise one or more of a gelling agent, a bulking agent, a buffer, a coloring agent and a plasticizer.

Suitably, the gelling agent may be, for example, a polysaccharide or cellulosic gelling agent, a gelatin, a gum, a gel, a wax or a mixture thereof. Suitable polysaccharides include alginates, dextrans, maltodextrins, cyclodextrins and pectins. Suitable alginates include, for instance, a salt of alginic acid, an esterified alginate or glyceryl alginate. Salts of alginic acid include ammonium alginate, triethanolamine alginate, and group I or II metal ion alginates like sodium, potassium, calcium and magnesium alginate. Esterified alginates include propylene glycol alginate and glyceryl alginate. In an embodiment, the barrier material is sodium alginate and/or calcium alginate. Suitable cellulosic materials include methyl cellulose, ethyl cellulose, hydroxyethyl cellulose, hydroxypropyl cellulose, carboxymethyl cellulose, cellulose acetate and cellulose ethers. The gelling agent may comprise one or more modified starches. The gelling agent may comprise carrageenans. Suitable gums include agar, gellan gum, gum Arabic, pullulan gum, mannan gum, gum ghatti, gum tragacanth, Karaya, locust bean, acacia gum, guar, quince seed and xanthan gums. Suitable gels include agar, agarose, carrageenans, furoidan and furcellaran. Suitable waxes include carnauba wax. In some cases, the gelling agent may comprise carrageenans and/or gellan gum; these gelling agents are particularly suitable for inclusion as the gelling agent as the pressure required to break the resulting capsules is particularly suitable.

The barrier material may comprise one or more bulking agents, such as starches, modified starches (such as oxidised starches) and sugar alcohols such as maltitol.

The barrier material may comprise a coloring agent which renders easier the location of the capsule within the aerosol generating device during the manufacturing process of the aerosol generating device. The coloring agent chosen among colorants and pigments.

The barrier material may further comprise at least one buffer, such as a citrate or phosphate compound.

The barrier material may further comprise at least one plasticizer, which may be glycerol, sorbitol, maltitol, triacetin, polyethylene glycol, propylene glycol or another polyalcohol with plasticizing properties, and optionally one acid of the monoacid, diacid or triacid type, especially citric acid, fumaric acid, malic acid, and the like. The amount of plasticizer ranges from 1% to 30% by weight, from 2% to 15% by weight, or from 3 to 10% by weight of the total dry weight of the shell.

The barrier material may also comprise one or more filler materials. Suitable filler materials include comprising starch derivatives such as dextrin, maltodextrin, cyclodextrin (alpha, beta or gamma), or cellulose derivatives such as hydroxypropyl-methylcellulose (HPMC), hydroxypropylcellulose (HPC), methylcellulose (MC), carboxy-methylcellulose (CMC), polyvinyl alcohol, polyols or mixture thereof. Dextrin is a preferred filler. The amount of filler in the shell is at most 98.5%, preferably from 25 to 95%, more preferably from 40 to 80% and even more preferably from 50 to 60% by weight on the total dry weight of the shell.

The capsule shell may additionally comprise a hydrophobic outer layer which reduces the susceptibility of the capsule to moisture-induced degradation. The hydrophobic outer layer is suitably selected from the group comprising waxes, especially carnauba wax, candelilla wax or beeswax, carbowax, shellac (in alcoholic or aqueous solution), ethyl cellulose, hydroxypropyl methyl cellulose, hydroxyl-propylcellulose, latex composition, polyvinyl alcohol, or a combination thereof. In embodiments, the at least one moisture barrier agent is ethyl cellulose or a mixture of ethyl cellulose and shellac.

The capsule core comprises the aerosol modifier. This aerosol modifier may be any volatile substance which modifies at least one property of the aerosol. For example, the aerosol substance may modify the pH, the sensorial properties, the water content, the delivery characteristics or the flavor. In some cases, the aerosol modifier may be selected from an acid, a base, water or a flavorant. In some embodiments, the aerosol modifier comprises one or more flavorants.

The flavorant may suitably be licorice, rose oil, vanilla, lemon oil, orange oil, a mint-flavor, suitably menthol and/or a mint oil from any species of the genus Mentha such as peppermint oil and/or spearmint oil, or lavender, fennel or anise.

In some cases, the flavorant comprises menthol.

In some cases, the capsule may comprise at least about 25% w/w flavorant (based on the total weight of the capsule), suitably at least about 30% w/w f flavorant, 35% w/w flavorant, 40% w/w flavorant, 45% w/w flavorant or 50% w/w flavorant.

In some cases, the core may comprise at least about 25% w/w flavorant (based on the total weight of the core), suitably at least about 30% w/w flavorant, 35% w/w flavorant, 40% w/w flavorant, 45% w/w flavorant or 50% w/w flavorant. In some cases, the core may comprise less than or equal to about 75% w/w flavorant (based on the total weight of the core), suitably less than or equal to about 65% w/w flavorant, 55% w/w flavorant, or 50% w/w flavorant. Illustratively, the capsule may include an amount of flavorant in the range of 25-75% w/w (based on the total weight of the core), about 35-60% w/w or about 40-55% w/w.

The capsules may include at least about 2 mg, 3 mg or 4 mg of the aerosol modifier, suitably at least about 4.5 mg of the aerosol modifier, 5 mg of the aerosol modifier, 5.5 mg of the aerosol modifier or 6 mg of the aerosol modifier.

In some cases, the consumable comprises at least about 7 mg of the aerosol modifier, suitably at least about 8 mg of the aerosol modifier, 10 mg of the aerosol modifier, 12 mg of the aerosol modifier or 15 mg of the aerosol modifier. The core may also comprise a solvent which dissolves the aerosol modifier.

Any suitable solvent may be used.

Where the aerosol modifier comprises a flavorant, the solvent may suitably comprise short or medium chain fats and oils. For example, the solvent may comprise tri-esters of glycerol such as C2-C12 triglycerides, suitably C6-C10 triglycerides or Cs-C12 triglycerides. For example, the solvent may comprise medium chain triglycerides (MCT-C8-C12), which may be derived from palm oil and/or coconut oil.

The esters may be formed with caprylic acid and/or capric acid. For example, the solvent may comprise medium chain triglycerides which are caprylic triglycerides and/or capric tryglycerides. For example, the solvent may comprise compounds identified in the CAS registry by numbers 73398-61-5, 65381-09-1, 85409-09-2. Such medium chain triglycerides are odourless and tasteless.

The hydrophilic-lipophilic balance (HLB) of the solvent may be in the range of 9 to 13, suitably 10 to 12. Methods of making the capsules include co-extrusion, optionally followed by centrifugation and curing and/or drying. The contents of WO 2007/010407 A2 is incorporated by reference, in its entirety.

In the examples described above, the mouthpieces 2, 2' each comprise a single body of material 6. In other examples, either the mouthpiece of FIG. 1 or of FIGS. 2*a* and 2*b* may include multiple bodies of material. The mouthpieces 2, 2' may comprise a cavity between the bodies of material.

In some examples, the mouthpiece 2, 2' downstream of the aerosol generating material 3 can comprise a wrapper, for instance the first or second plug wraps 7, 9, or tipping paper 5, which comprises an aerosol modifying agent as described herein or other sensate material. The aerosol modifying agent may be disposed on an inwardly or outwardly facing surface of the mouthpiece wrapper. For instance, the aerosol modifying agent or other sensate material may be provided on an area of the wrapper, such as an outwardly facing surface of the tipping paper 5, which comes into contact with the consumer's lips during use. By disposing the aerosol modifying agent or other sensate material on the outwardly facing surface of the mouthpiece wrapper, the aerosol modifying agent or other sensate material may be transferred to the consumer's lips during use. Transfer of the aerosol modifying agent or other sensate material to the consumer's lips during use of the article may modify the organoleptic properties (e.g. taste) of the aerosol generated by the aerosol generating substrate 3 or otherwise provide the consumer with an alternative sensory experience. For example, the aerosol modifying agent or other sensate material may impart flavor to the aerosol generated by the aerosol generating substrate 3. The aerosol modifying agent or other sensate material may be at least partially soluble in water such that it is transferred to the user via the consumer's saliva. The aerosol modifying agent or other sensate material may be one that volatizes by the heat generated by the aerosol provision system. This may facilitate transfer of the aerosol modifying agent to the aerosol generated by the aerosol generating substrate 3. A suitable sensate material may be a flavor as described herein, sucralose or a cooling agent such as menthol or similar.

A non-combustible aerosol provision device is used to heat the aerosol generating material 3 of the articles 1, 1' described herein. The non-combustible aerosol provision device preferably comprises a coil, since this has been found to enable improved heat transfer to the article 1, 1' as compared to other arrangements.

In some examples, the coil is configured to, in use, cause heating of at least one electrically-conductive heating element, so that heat energy is conductible from the at least one electrically-conductive heating element to the aerosol generating material to thereby cause heating of the aerosol generating material.

In some examples, the coil is configured to generate, in use, a varying magnetic field for penetrating at least one heating element, to thereby cause induction heating and/or magnetic hysteresis heating of the at least one heating element. In such an arrangement, the or each heating element may be termed a "susceptor" as defined herein. A coil that is configured to generate, in use, a varying magnetic field for penetrating at least one electrically-conductive heating element, to thereby cause induction heating of the at least one electrically-conductive heating element, may be termed an "induction coil" or "inductor coil".

The device may include the heating element(s), for example electrically-conductive heating element(s), and the heating element(s) may be suitably located or locatable relative to the coil to enable such heating of the heating element(s). The heating element(s) may be in a fixed position relative to the coil. Alternatively, the at least one heating element, for example at least one electrically-conductive heating element, may be included in the article 1, 1' for insertion into a heating zone of the device, wherein the article 1, 1' also comprises the aerosol generating material 3 and is removable from the heating zone after use. Alternatively, both the device and such an article 1, 1' may comprise at least one respective heating element, for example at least one electrically-conductive heating element, and the coil may be to cause heating of the heating element(s) of each of the device and the article when the article is in the heating zone.

In some examples, the coil is helical. In some examples, the coil encircles at least a part of a heating zone of the device that is configured to receive aerosol generating material. In some examples, the coil is a helical coil that encircles at least a part of the heating zone. In some examples, the device comprises an electrically-conductive heating element that at least partially surrounds the heating zone, and the coil is a helical coil that encircles at least a part of the electrically-conductive heating element. In some examples, the electrically-conductive heating element is tubular. In some examples, the coil is an inductor coil. In some examples, the use of a coil enables the non-combustible aerosol provision device to reach operational temperature more quickly than a non-coil aerosol provision device. For instance, the non-combustible aerosol provision device including a coil as described above can reach an operational temperature such that a first puff can be provided in less than 30 seconds from initiation of a device heating program, preferably in less than 25 seconds. In some examples, the device can reach an operational temperature in about 20 seconds from the initiation of a device heating program.

The use of a coil as described herein in the device to cause heating of the aerosol generating material has been found to enhance the aerosol which is produced. For instance, consumers have reported that the aerosol generated by a device including a coil such as that described herein is sensorially closer to that generated in factory made cigarette (FMC) products than the aerosol produced by other non-combustible aerosol provision systems. Without wishing to be bound by theory, it is hypothesized that this is the result of the reduced time to reach the required heating temperature when the coil is used, the higher heating temperatures achievable when the coil is used and/or the fact that the coil enables such systems to simultaneously heat a relatively large volume of aerosol generating material, resulting in aerosol temperatures resembling FMC aerosol temperatures. In FMC products, the burning coal generates a hot aerosol which heats tobacco in the tobacco rod behind the coal, as the aerosol is drawn through the rod. This hot aerosol is understood to release compounds from tobacco in the rod behind the burning coal. A device including a coil as described herein is thought to also be capable of heating aerosol generating material, such as tobacco material described herein, to release flavor compounds, resulting in an aerosol which has been reported to more closely resemble an FMC aerosol.

Using an aerosol provision system including a coil as described herein, for instance an induction coil which heats at least some of the aerosol generating material to at least 200° C., at least 220° C., can enable the generation of an aerosol from an aerosol generating material that has particular characteristics which are thought to more closely resemble those of an FMC product. For example, when heating an aerosol generating material, including nicotine, using an induction heater, heated to at least 250° C., for a two-second period, under an airflow of at least 1.50 L/m during the period, one or more of the following characteristics has been observed:

- at least 10 μg of nicotine is aerosolized from the aerosol generating material;
- the weight ratio in the generated aerosol, of aerosol forming material to nicotine is at least about 2.5:1, suitably at least 8.5:1;
- at least 100 μg of the aerosol forming material can be aerosolized from the aerosol generating material;
- the mean particle or droplet size in the generated aerosol is less than about 1000 nm; and
- the aerosol density is at least 0.1 μg/cc.

In some cases, at least 10 μg of nicotine, suitably at least 30 μg or 40 μg of nicotine, is aerosolized from the aerosol generating material under an airflow of at least 1.50 L/m during the period. In some cases, less than about 200 μg, suitably less than about 150 μg or less than about 125 μg, of nicotine is aerosolized from the aerosol generating material under an airflow of at least 1.50 L/m during the period.

In some cases, the aerosol contains at least 100 μg of the aerosol forming material, suitably at least 200 μg, 500 μg or 1 mg of aerosol forming material is aerosolized from the aerosol generating material under an airflow of at least 1.50 L/m during the period. Suitably, the aerosol forming material may comprise or consist of glycerol.

As defined herein, the term "mean particle or droplet size" refers to the mean size of the solid or liquid components of an aerosol (i.e. the components suspended in a gas). Where the aerosol contains suspended liquid droplets and suspended solid particles, the term refers to the mean size of all components together.

In some cases, the mean particle or droplet size in the generated aerosol may be less than about 900 nm, 800 nm, 700, nm 600 nm, 500 nm, 450 nm or 400 nm. In some cases, the mean particle or droplet size may be more than about 25 nm, 50 nm or 100 nm.

In some cases, the aerosol density generated during the period is at least 0.1 μg/cc. In some cases, the aerosol density is at least 0.2 μg/cc, 0.3 μg/cc or 0.4 μg/cc. In some cases, the aerosol density is less than about 2.5 μg/cc, 2.0 μg/cc, 1.5 μg/cc or 1.0 μg/cc.

The non-combustible aerosol provision device can be arranged to heat the aerosol generating material 3 of the article 1, 1', to a maximum temperature of at least 160° C. In embodiments, the non-combustible aerosol provision device is arranged to heat the aerosol forming material 3 of the article 1, 1', to a maximum temperature of at least about 200° C., or at least about 220° C., or at least about 240° C., or at least about 270° C., at least once during the heating process followed by the non-combustible aerosol provision device.

Using an aerosol provision system including a coil as described herein, for instance an induction coil which heats at least some of the aerosol generating material to at least 200° C., or at least 220° C., can enable the generation of an aerosol from an aerosol generating material in an article 1, 1' as described herein that has a higher temperature as the aerosol leaves the mouth end of the mouthpiece 2, 2' than previous devices, contributing to the generation of an aerosol which is considered closer to an FMC product. For instance, the maximum aerosol temperature measured at the mouth-end of the article 1, 1' can be greater than 50° C., or greater than 55° C. or greater than 56° C. or 57° C. Additionally or alternatively, the maximum aerosol temperature measured at the mouth-end of the article 1, 1' can be less than 62° C., or less than 60° C. or less than 59° C. In some embodiments, the maximum aerosol temperature measured at the mouth-end of the article 1, 1' can be between 50° C. and 62° C. or between 56° C. and 60° C.

Figure 3:
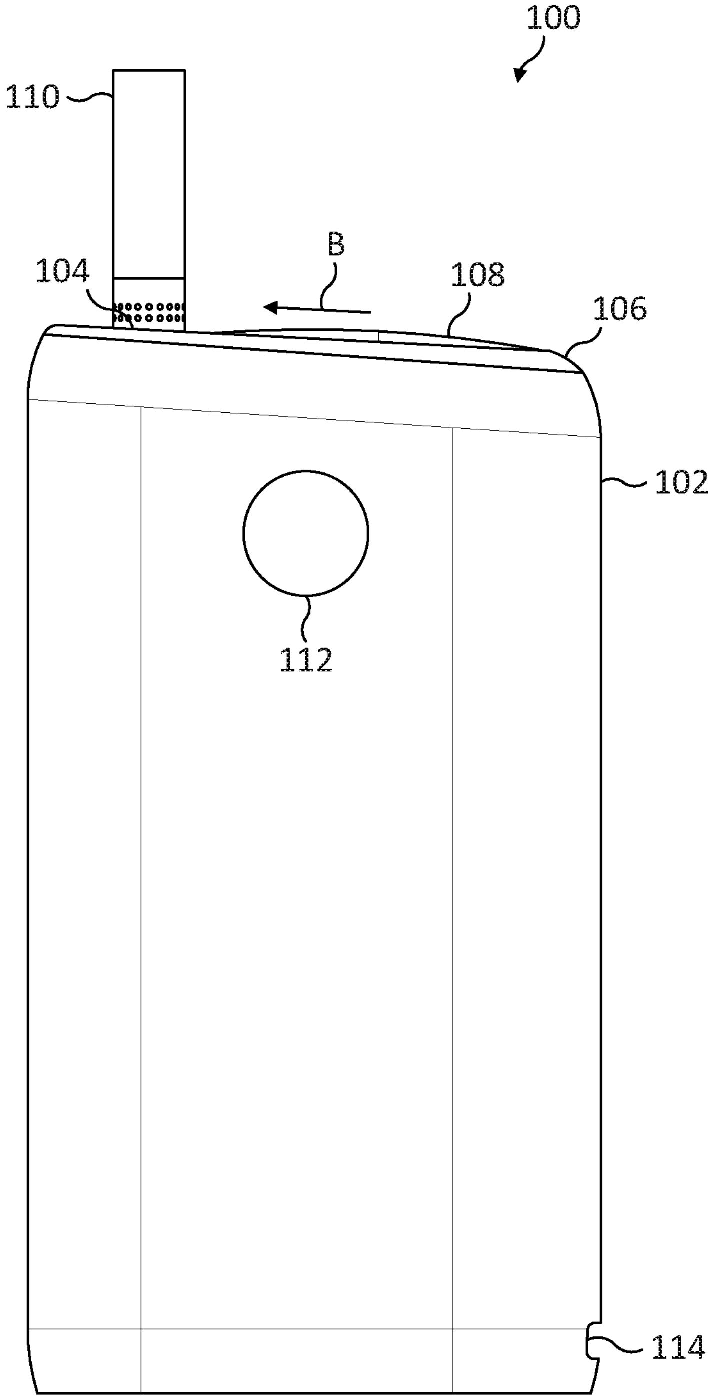
FIG. 3 is a perspective illustration of a non-combustible aerosol provision device for generating aerosol from the aerosol generating material of the articles of FIGS. 1, 2*a* and 2*b;*

FIG. 3 shows an example of a non-combustible aerosol provision device 100 for generating aerosol from an aerosol generating medium/material such as the aerosol generating material 3 of the articles 1, 1' described herein. In broad outline, the device 100 may be used to heat a replaceable article 110 comprising the aerosol generating medium, for instance the articles 1, 1' described herein, to generate an aerosol or other inhalable medium which is inhaled by a user of the device 100. The device 100 and replaceable article 110 together form a system.

The device 100 comprises a housing 102 (in the form of an outer cover) which surrounds and houses various components of the device 100. The device 100 has an opening

104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 3, the lid 108 is shown in an open configuration, however the lid 108 may move into a closed configuration. For example, a user may cause the lid 108 to slide in the direction of arrow "B".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

Figure 4:
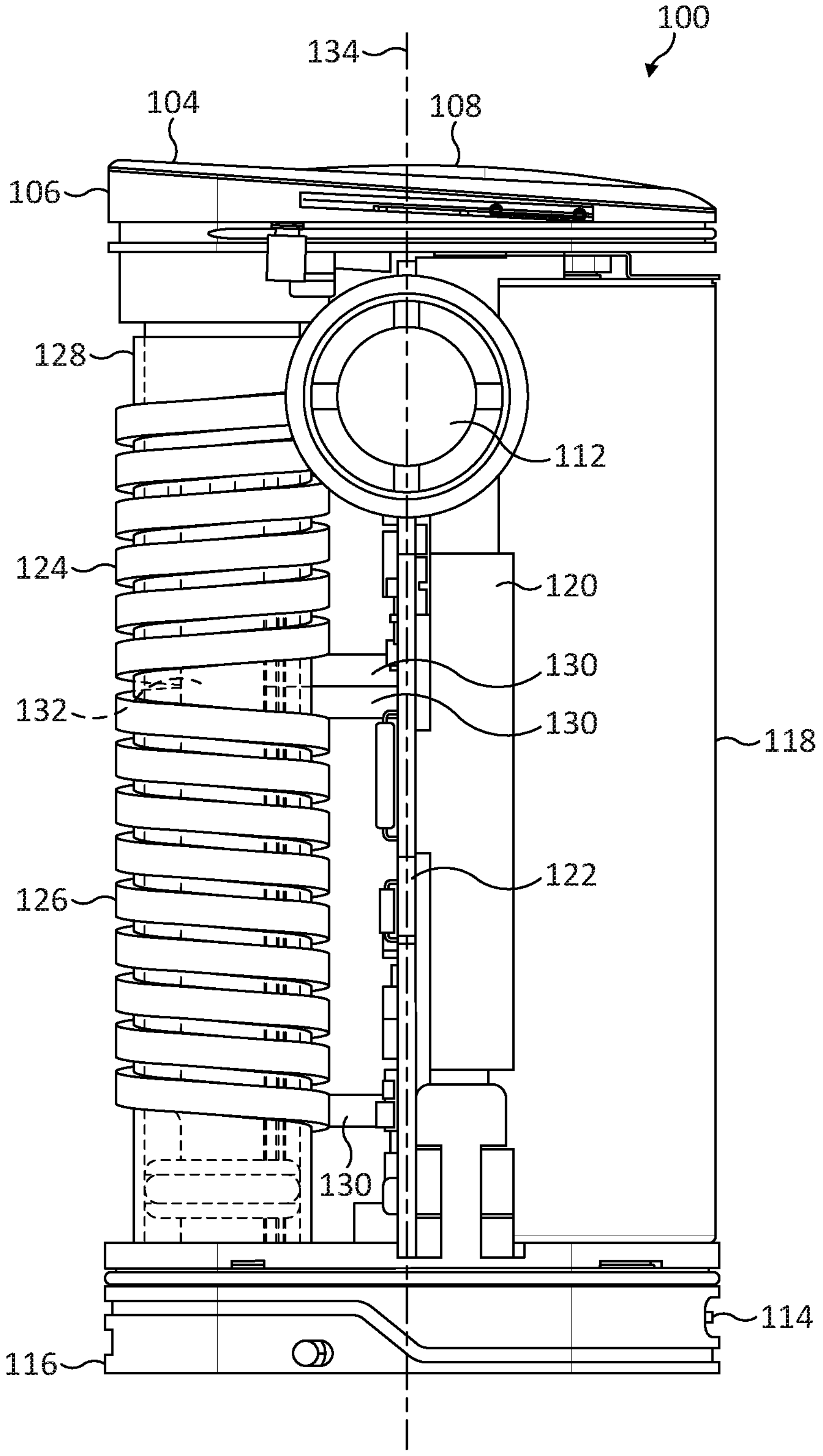
FIG. 4 illustrates the device of FIG. 3 with the outer cover removed and without an article present.

FIG. 4 depicts the device 100 of FIG. 3 with the outer cover 102 removed and without an article 110 present. The device 100 defines a longitudinal axis 134.

As shown in FIG. 4, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 4, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material than the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section/portion of the article 110, and at a later time, the second inductor coil 126 may be operating to heat a second section/portion of the article 110. Winding the coils in opposite directions helps reduce the current induced in the inactive coil when used in conjunction with a particular type of control circuit. In FIG. 4, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The susceptor 132 may be made from one or more materials. Preferably the susceptor 132 comprises carbon steel having a coating of Nickel or Cobalt.

In some examples, the susceptor 132 may comprise at least two materials capable of being heated at two different frequencies for selective aerosolization of the at least two materials. For example, a first section of the susceptor 132 (which is heated by the first inductor coil 124) may comprise a first material, and a second section of the susceptor 132 which is heated by the second inductor coil 126 may comprise a second, different material. In another example, the first section may comprise first and second materials, where the first and second materials can be heated differently based upon operation of the first inductor coil 124. The first and second materials may be adjacent along an axis defined by the susceptor 132, or may form different layers within the susceptor 132. Similarly, the second section may comprise third and fourth materials, where the third and fourth materials can be heated differently based upon operation of the second inductor coil 126. The third and fourth materials may be adjacent along an axis defined by the susceptor 132, or may form different layers within the susceptor 132. Third material may the same as the first material, and the fourth material may be the same as the second material, for example. Alternatively, each of the materials may be different. The susceptor may comprise carbon steel or aluminum for example.

The device 100 of FIG. 4 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 4, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 5:
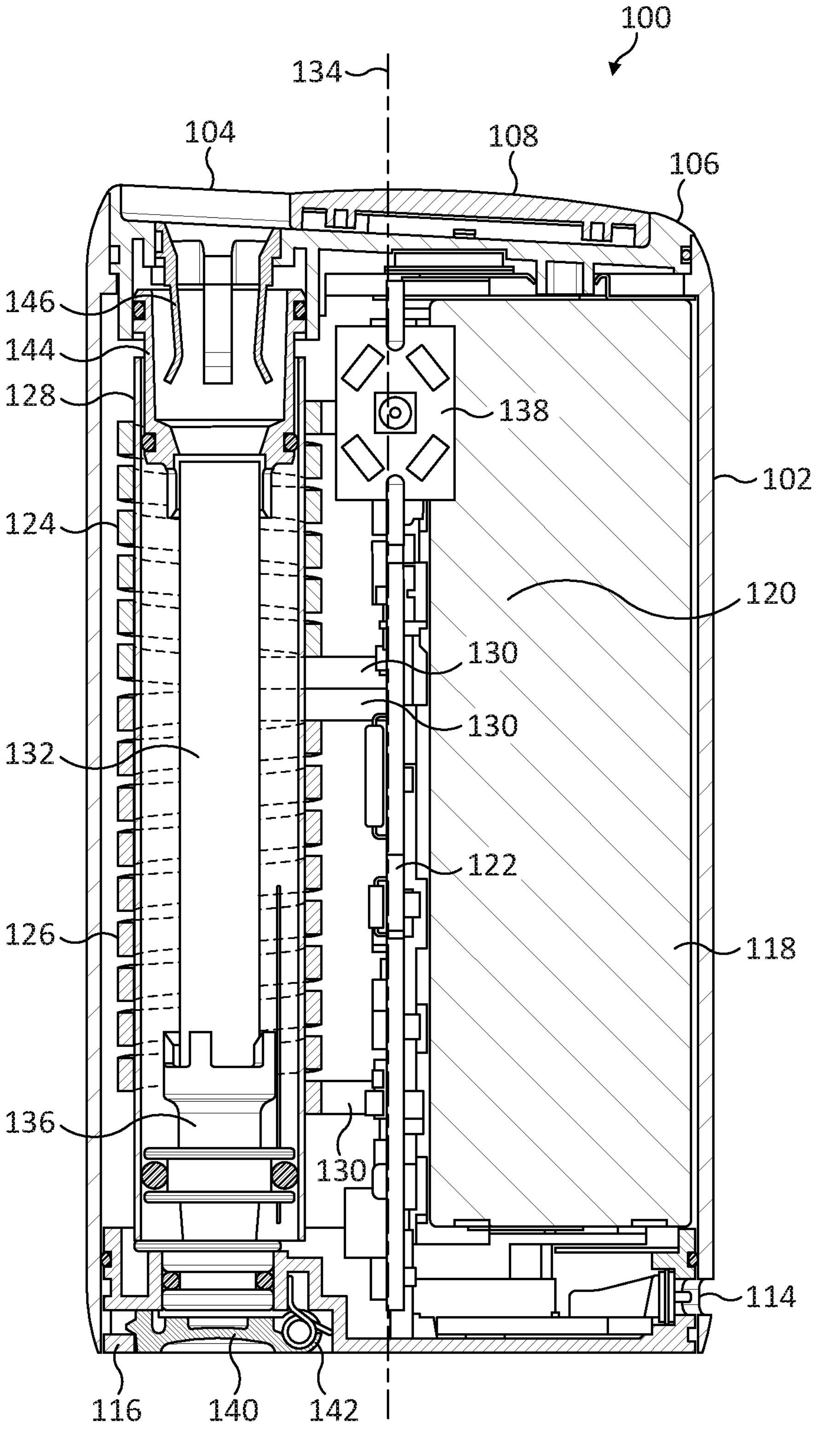
FIG. 5 is a side view of the device of FIG. 3 in partial cross-section.

FIG. 5 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 6:
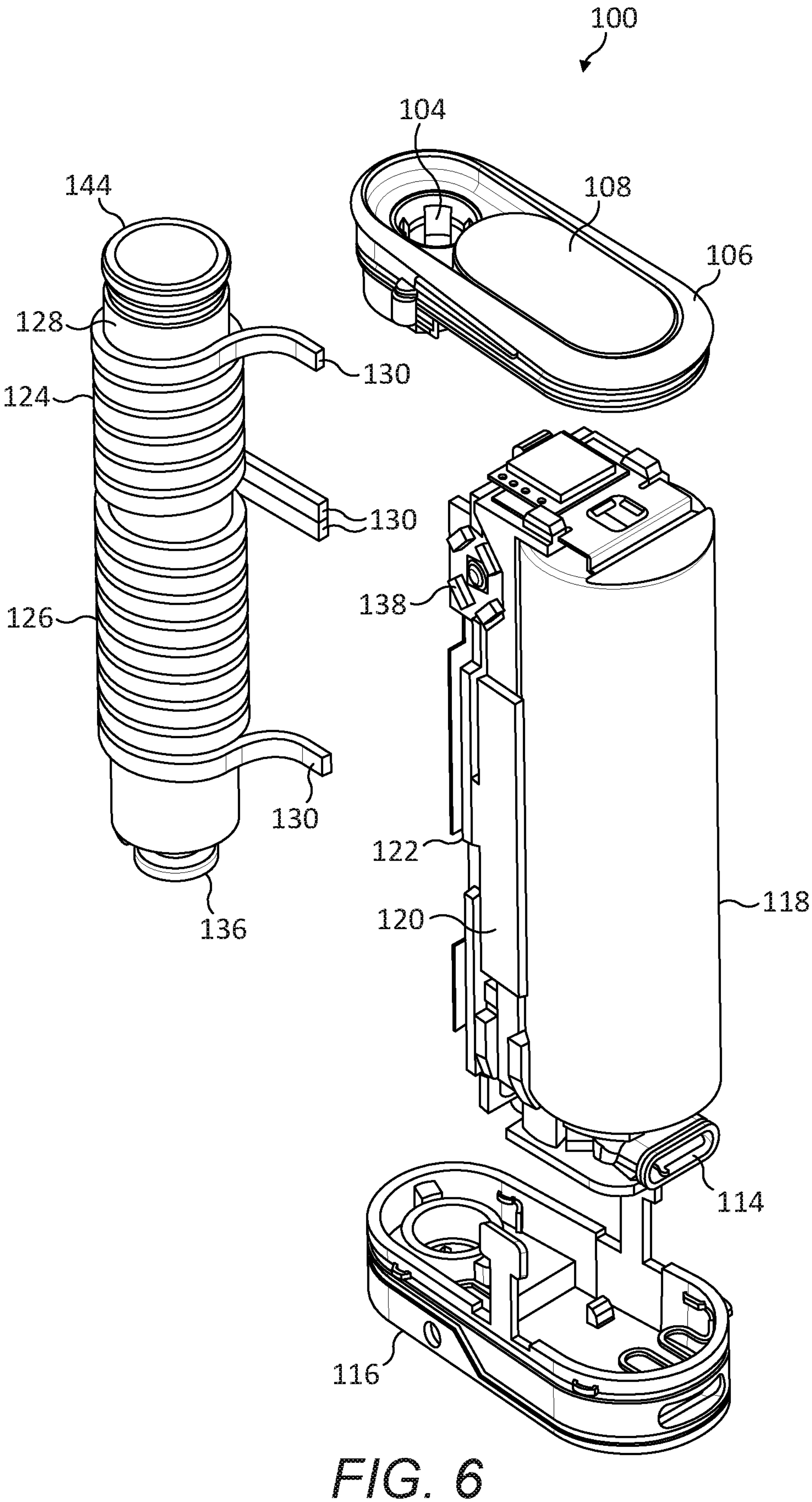
FIG. 6 is an exploded view of the device of FIG. 3, with the outer cover omitted.

FIG. 6 is an exploded view of the device 100 of FIG. 5, with the outer cover 102 omitted.

Figure 7A:
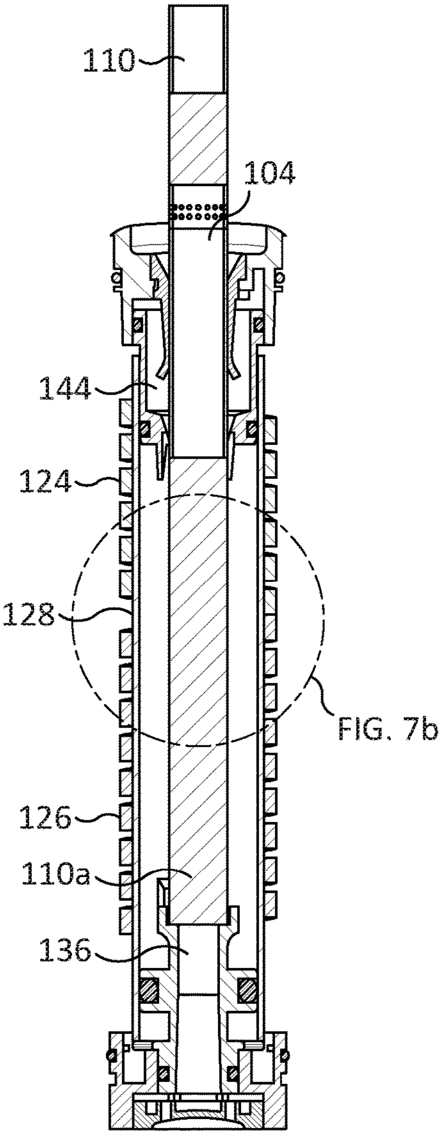
FIG. 7A is a cross sectional view of a portion of the device of FIG. 3.
Figure 7B:
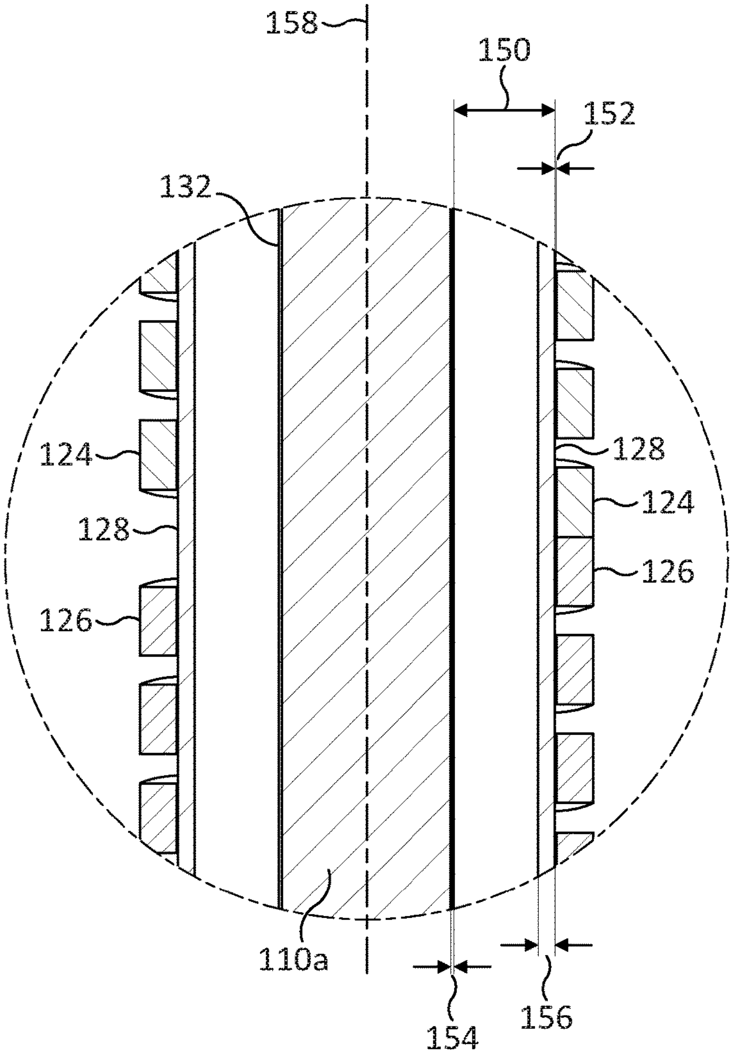
FIG. 7B is a close-up illustration of a region of the device of FIG. 7A.

FIG. 7A depicts a cross section of a portion of the device 100 of FIG. 5. FIG. 7B depicts a close-up of a region of FIG. 7A. FIGS. 7A and 7B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials and/or a cooling structure.

FIG. 7B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3-3.5 mm, or about 3.25 mm.

FIG. 7B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

In use, the articles 1, 1' described herein can be inserted into a non-combustible aerosol provision device such as the device 100 described with reference to FIGS. 3 to 7. At least a portion of the mouthpiece 2, 2' of the article 1, 1' protrudes from the non-combustible aerosol provision device 100 and can be placed into a user's mouth. An aerosol is produced by heating the aerosol generating material 3 using the device 100. The aerosol produced by the aerosol generating material 3 passes through the mouthpiece 2 to the user's mouth.

The articles 1, 1' described herein have particular advantages, for instance when used with non-combustible aerosol provision devices such as the device 100 described with reference to FIGS. 3 to 7. In particular, the first tubular element 4 formed from filamentary tow has surprisingly been found to have a significant influence on the temperature of the outer surface of the mouthpiece 2 of the articles 1, 1'. For instance, where the hollow tubular element 4 formed from filamentary tow is wrapped in an outer wrapper, for instance the tipping paper 5, an outer surface of the outer wrapper at a longitudinal position corresponding to the location of the hollow tubular element 4 has been found to reach a maximum temperature of less than 42° C. during use, suitably less than 40° C. and more suitably less than 38° C. or less than 36° C.

Table 2.0 below shows the temperature of the outer surface of the article 1 as described with reference to FIG. 1 herein when heated using the device 100 described with reference to FIGS. 3 to 7 herein. First, second and third temperature measuring probes were used as corresponding first, second and third positions along the mouthpiece 2 of the article 1. The first position (numbered as position 1 in table 2.0) was at 4 mm from the downstream end 2*b* of the mouthpiece 2, the second position (numbered as position 2 in table 2.0) was at 8 mm from the downstream end 2*b* of the mouthpiece 2, and the third position (numbered as position 3 in table 2.0) was at 12 mm from the downstream end 2*b* of the mouthpiece 2.

The first position was therefore on the outer surface of the part of the mouthpiece 2 in which the first tubular element 4 is disposed, while the second and third positions were on the outer surface of the part of the mouthpiece 2 in which the body of material 6 is disposed.

A control article was tested for comparison with the filamentary tow tubular elements 4 described herein, and used instead of the filamentary tow tubular element 4 a known spirally wrapped paper tube having the same construction as the second hollow tubular element 8 described herein, but a length of 6 mm rather than 25 mm.

Testing was performed for the first 5 puffs on the article, since by the 5th puff temperatures have generally peaked and are starting to fall, so that an approximate maximum temperature can be observed. Each sample was tested 5 times, and the temperatures provided are an average of these 5 tests. The known Health Canada Intense puffing regime was applied (55 ml puff volume applied for 2 seconds duration every 30 seconds) using standard testing equipment.

As shown in the table below, surprisingly, it was found that the use of a tubular element 4 formed from filamentary tow reduced the outer surface temperature of the mouthpiece 2 as compared to the control article in every puff and at every testing position on the mouthpiece 2. The tubular element 4 formed from filamentary tow was particular effective at reducing the temperature at the first probe position, where consumer's lips will be positioned when using the article 1. In particular, the temperature of the outer surface of the mouthpiece 2 at the first probe position was reduced by more than 7° C. in the first three puffs and by more than 5° C. in the fourth and fifth puffs.

TABLE 2.0

| Probe Pos. | Consumable Mouth End | Puff 1 | Puff 2 | Puff 3 | Puff 4 | Puff 5 |
|---|---|---|---|---|---|---|
| 1 | Paper Tube (control) | 38.98 | 42.50 | 43.26 | 42.38 | 40.52 |
| | Tow tubular element 4 | 31.79 | 35.00 | 35.72 | 35.46 | 34.64 |
| 2 | Paper Tube (control) | 41.60 | 45.34 | 47.05 | 46.36 | 44.58 |
| | Tow Tubular element 4 | 40.32 | 43.48 | 43.73 | 43.21 | 41.73 |
| 3 | Paper Tube (control) | 46.71 | 48.93 | 50.51 | 53.14 | 54.63 |
| | Tow Tubular element 4 | 45.43 | 47.73 | 47.64 | 47.72 | 47.36 |

Figure 8:
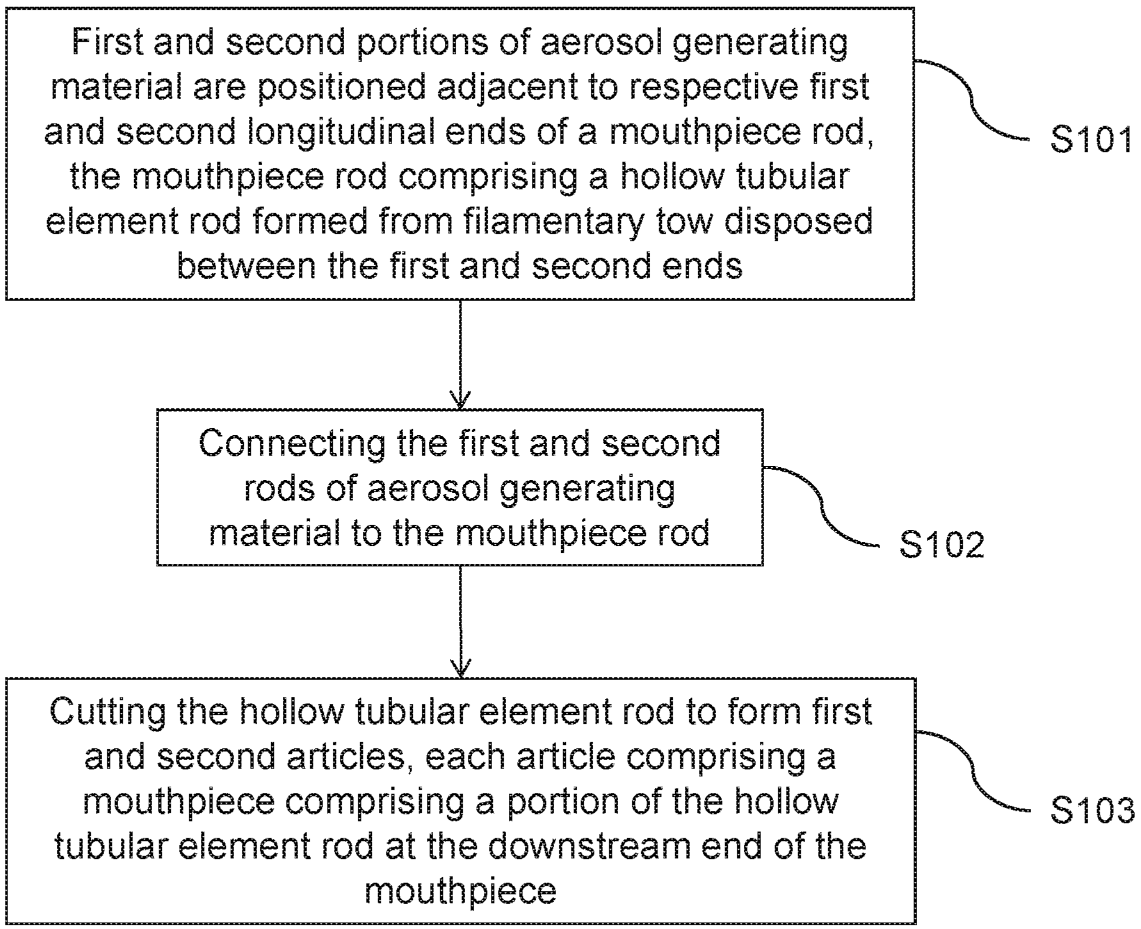
FIG. 8 is a flow diagram illustrating a method of manufacturing an article for use with a non-combustible aerosol provision device.

FIG. 8 illustrates a method of manufacturing an article for use in a non-combustible aerosol provision system. At step S101, first and second portions of aerosol generating material, each comprising an aerosol forming material, are positioned adjacent to respective first and second longitudinal ends of a mouthpiece rod, the mouthpiece rod comprising a hollow tubular element rod formed from filamentary tow disposed between the first and second ends. In the present example, the hollow tubular element rod comprises a double length first hollow tubular element 4 arranged between first and second respective bodies of material 6. At the outer end of each body of material 6 is positioned a respective second tubular element 8 and it is adjacent to the outer ends of these second tubular elements 8 that the first and second portions of aerosol generating material are positioned. The mouthpiece rod is wrapped in the second plug wrap described herein.

At step S102, the first and second portions of aerosol generating material are connected to the mouthpiece rod. In the present example, this is performed by wrapping a tipping paper 5 as described herein around the mouthpiece rod and at least part of each of the portions of aerosol generating material 3. In the present example, the tipping paper 5 extends about 5 mm longitudinally over the outer surface of each of the portioned of aerosol generating material 3.

At step S103, the hollow tubular element rod is cut to form first and second articles, each article comprising a mouthpiece comprising a portion of the hollow tubular element rod at the downstream end of the mouthpiece. In the present example, double length first hollow tubular element 4 of the mouthpiece rod is cut at a position about half-way along its length, so as to form first and second substantially identical articles.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure 5, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc, other than those specifically described herein. In addition, this disclosure may include inventions not presently claimed, but which may be claimed in future.

The invention claimed is:

1. A non-combustible aerosol provision system comprising:

an article comprising a rod of aerosol generating material having a circumference greater than 19 mm and a mouthpiece, wherein the mouthpiece is the part of the article downstream of the aerosol generating material; and a non-combustible aerosol provision device for heating the aerosol generating material of the article, the non-combustible aerosol provision device comprising a coil, wherein the system comprises a pressure drop across the mouthpiece of less than 40 $mmH_2O$ and at least 15 $mmH_2O$.

2. The system of claim 1, wherein the rod of aerosol generating material has a circumference greater than 20 mm and wherein the rod of aerosol generating material has a circumference less than 23 mm.

3. The system of claim 1, wherein the rod of aerosol generating material is wrapped in a wrapper having a permeability of less than 100 Coresta Units, less than 60 Coresta Units or less than 20 Coresta Units.

4. The system of claim 3, wherein wrapper comprises a metallic layer.

5. The system of claim 4, wherein the metallic layer comprises aluminum.

6. The system of claim 4, wherein the thickness of the metallic layer is between 2 μm and 16 μm.

7. The system of claim 1, wherein the aerosol generating material comprises paper cast reconstituted tobacco material.

8. The system of claim 7, wherein the reconstituted tobacco material has a density less than about 700 milligrams per cubic centimeter.

9. The system of claim 7, wherein the reconstituted tobacco material has a density of at least about 350 milligrams per cubic centimeter.

10. The system of claim 1, wherein the aerosol generating material comprises an aerosol forming material.

11. The system of claim 10, wherein the aerosol forming material comprises at least one selected from glycerol, propylene glycol, a combination of glycerol and propylene glycol, glycerine, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, propylene carbonate and combinations thereof.

12. The system of claim 1, wherein the aerosol generating material comprises tobacco material cut to a width of between about 0.5 mm and 2.0 mm, or between about 0.6 mm and 1.7 mm, or between about 0.6 mm and 1.5 mm, or between about 1.0 mm and 1.5 mm.

13. The system of claim 1, wherein the aerosol generating material comprises paper reconstituted tobacco material and at least one of band cast reconstituted tobacco material, granular tobacco material and lamina tobacco material.

14. The system of claim 1, wherein the aerosol generating material comprises a weight of greater than 200 mg, or a weight of between about 200 mg and about 400 mg, or between about 230 mg and about 360 mg, or a weight of between about 250 mg and 360 mg.

15. The system of claim 1, wherein the non-combustible aerosol provision device is configured to heat the aerosol generating material to a maximum temperature of at least about 160° C., or at least about 200° C., or at least about 220° C., or at least about 240° C.

16. The system of claim 1, wherein the non-combustible aerosol provision device is arranged to heat the aerosol generating material to a maximum temperature of at least 270° C.

17. The system of claim 1, wherein the pressure drop across the mouthpiece is less than 32 $mmH_2O$.

18. The system of claim 1, wherein the article has a closed pressure drop of between 150 $mmH_2O$ and 300 $mmH_2O$ or between 150 $mmH_2O$ and 220 $mmH_2O$ or between 150 $mmH_2O$ and 200 $mmH_2O$.

19. The system of claim 1, wherein the aerosol generating material is in the form of a substantially cylindrical rod of between about 10 mm and 100 mm in length or in the form of a substantially cylindrical rod of between about 10 mm and 15 mm in length or between about 15 mm and about 100 mm in length.

20. The system of claim 1, wherein the coil comprises an induction coil.

21. The system of claim 1, further comprising at least one electrically-conductive heating element for heating the aerosol generating material and wherein the coil is configured, in use, to cause heating of the at least one electrically-conductive heating element.

* * * * *